US012647352B2

(12) United States Patent　　　　(10) Patent No.:　US 12,647,352 B2
Pitio et al.　　　　　　　　　　　　(45) **Date of Patent:　*Jun. 2, 2026**

(54) VERIFICATION OF DATA PROCESSES IN A NETWORK OF COMPUTING RESOURCES

(71) Applicant: ROYAL BANK OF CANADA, Toronto (CA)

(72) Inventors: Walter Michael Pitio, Morganville, NJ (US); Philip Iannaccone, New York, NY (US); James Brown, New York, NY (US); Jeffrey Roy Betten, New York, NY (US); Mitchell Joseph Aiosa Morris, Chappaqua, NY (US)

(73) Assignee: ROYAL BANK OF CANADA, Montreal (CA)

( * ) Notice: Subject to any disclaimer, the term of this patent is extended or adjusted under 35 U.S.C. 154(b) by 68 days.

This patent is subject to a terminal disclaimer.

(21) Appl. No.: 18/385,199

(22) Filed: Oct. 30, 2023

(65) Prior Publication Data

US 2024/0064095 A1　　Feb. 22, 2024

Related U.S. Application Data

(63) Continuation of application No. 17/843,839, filed on Jun. 17, 2022, now Pat. No. 11,824,768, which is a (Continued)

(51) Int. Cl.
*H04L 45/30*　　　(2022.01)
*G06F 21/62*　　　(2013.01)

(Continued)

(52) U.S. Cl.
CPC ........ *H04L 45/306* (2013.01); *G06F 21/6227* (2013.01); *G06Q 20/027* (2013.01);

(Continued)

(58) Field of Classification Search
None
See application file for complete search history.

(56) References Cited

U.S. PATENT DOCUMENTS 5,852,666　A　　12/1998　Miller
6,145,079　A　　11/2000　Mitty et al.
(Continued)

FOREIGN PATENT DOCUMENTS

EP　　　0838056　　　5/2000
EP　　　0669741　　　12/2003
(Continued)

OTHER PUBLICATIONS

Levardy, V., et al., "An Adaptive Process Model to Support Product Development Project Management", IEEE Transactions on Engineering Management (vol. 56, Issue: 4, 2009, pp. 600-620). (Year: 2009).*

(Continued)

*Primary Examiner* — Clay C Lee
(74) *Attorney, Agent, or Firm* — NORTON ROSE FULBRIGHT CANADA LLP

(57)　　　　ABSTRACT

In one aspect, a system for managing data processes in a network of computing resources is configured to: receive, from an instructor device, a parent request for execution of at least one parent data process executable by a plurality of computing resources at least one computing resource; generate at least one child request for execution of at least one corresponding child data process for routing to at least one corresponding destination device, each of the at least one child data process for executing at least a portion of the at least one parent data process, and each of the at least one child request including a respective destination key derived from at least one instructor key; and route each of the at least one child request to the at least one corresponding destina- (Continued)

tion device. The at least one child request can be obtained by a supervisor server via the routing.

20 Claims, 15 Drawing Sheets

Related U.S. Application Data continuation of application No. 16/359,192, filed on Mar. 20, 2019, now Pat. No. 11,368,391, which is a continuation of application No. 14/969,896, filed on Dec. 15, 2015, now Pat. No. 10,284,462.

(60) Provisional application No. 62/151,182, filed on Apr. 22, 2015, provisional application No. 62/091,971, filed on Dec. 15, 2014.

(51) Int. Cl.

| | | |
|---|---|---|
| *G06Q 20/02* | (2012.01) | |
| *G06Q 20/22* | (2012.01) | |
| *G06Q 20/38* | (2012.01) | |
| *H04L 45/302* | (2022.01) | |
| *G06Q 40/04* | (2012.01) | |
| *H04L 9/40* | (2022.01) | |
| *H04L 67/63* | (2022.01) | |

(52) U.S. Cl.
CPC ....... *G06Q 20/2295* (2020.05); *G06Q 20/382* (2013.01); *G06F 2209/5013* (2013.01); *G06Q 40/04* (2013.01); *H04L 63/0421* (2013.01); *H04L 63/123* (2013.01); *H04L 67/63* (2022.05); *H04L 2463/061* (2013.01)

(56) References Cited

U.S. PATENT DOCUMENTS

| | | | |
|---|---|---|---|
| 7,225,219 | B2 | 5/2007 | Giacomini et al. |
| 2002/0091533 | A1 | 7/2002 | Ims et al. |
| 2002/0128871 | A1 | 9/2002 | Adamson et al. |
| 2003/0079041 | A1 | 4/2003 | Parrella, Sr. et al. |
| 2004/0101142 | A1 | 5/2004 | Nasypny |
| 2005/0166058 | A1 | 7/2005 | Brokenshire et al. |
| 2006/0224431 | A1 | 10/2006 | von Helmolt et al. |
| 2007/0174429 | A1 | 7/2007 | Mazzaferri et al. |
| 2007/0179881 | A1 | 8/2007 | Lord |
| 2008/0040602 | A1* | 2/2008 | Williams ................. H04L 9/30 |
| | | | 713/153 |
| 2010/0094902 | A1 | 4/2010 | Vyvyan |
| 2010/0299243 | A1 | 11/2010 | Chiulli et al. |
| 2012/0210136 | A1 | 8/2012 | Haddad et al. |
| 2013/0304626 | A1* | 11/2013 | Aisen ..................... H04L 67/63 |
| | | | 705/37 |
| 2014/0108726 | A1 | 4/2014 | Laurich et al. |
| 2014/0108807 | A1 | 4/2014 | Orsini et al. |
| 2014/0279552 | A1 | 9/2014 | Ortiz et al. |
| 2014/0298012 | A1 | 10/2014 | Orsini et al. |
| 2015/0256609 | A1 | 9/2015 | Morton et al. |
| 2015/0269570 | A1 | 9/2015 | Phan et al. |
| 2015/0356555 | A1 | 12/2015 | Pennanen |
| 2019/0295156 | A1* | 9/2019 | Waelbroeck .......... G06Q 40/00 |

FOREIGN PATENT DOCUMENTS

| | | | | |
|---|---|---|---|---|
| EP | 1510951 | 3/2005 | | |
| WO | WO-2004045189 A2 * | 5/2004 | ............ | H04L 67/01 |

OTHER PUBLICATIONS

S. Suzuki and J_ Murai, "Blockchain as an Audit-Able Communication Channel," 2017 IEEE 41st Annual Computer Software and Applications Conference {COMPSAC), 2017, pp. 516-522.

* cited by examiner

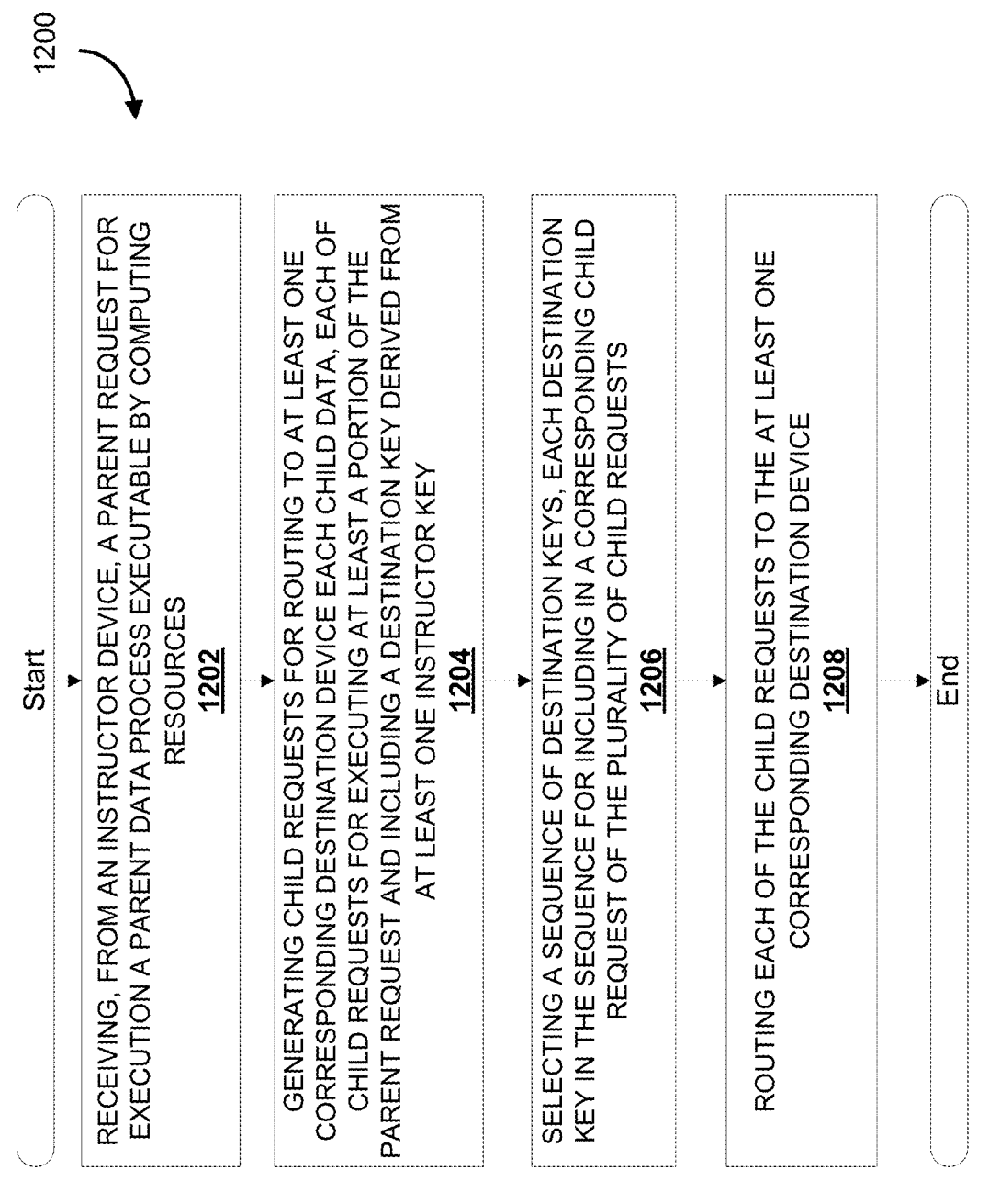

1200

Start

RECEIVING, FROM AN INSTRUCTOR DEVICE, A PARENT REQUEST FOR EXECUTION A PARENT DATA PROCESS EXECUTABLE BY COMPUTING RESOURCES
1202

GENERATING CHILD REQUESTS FOR ROUTING TO AT LEAST ONE CORRESPONDING DESTINATION DEVICE EACH CHILD DATA, EACH OF CHILD REQUESTS FOR EXECUTING AT LEAST A PORTION OF THE PARENT REQUEST AND INCLUDING A DESTINATION KEY DERIVED FROM AT LEAST ONE INSTRUCTOR KEY
1204

SELECTING A SEQUENCE OF DESTINATION KEYS, EACH DESTINATION KEY IN THE SEQUENCE FOR INCLUDING IN A CORRESPONDING CHILD REQUEST OF THE PLURALITY OF CHILD REQUESTS
1206

ROUTING EACH OF THE CHILD REQUESTS TO THE AT LEAST ONE CORRESPONDING DESTINATION DEVICE
1208

End

FIG. 12

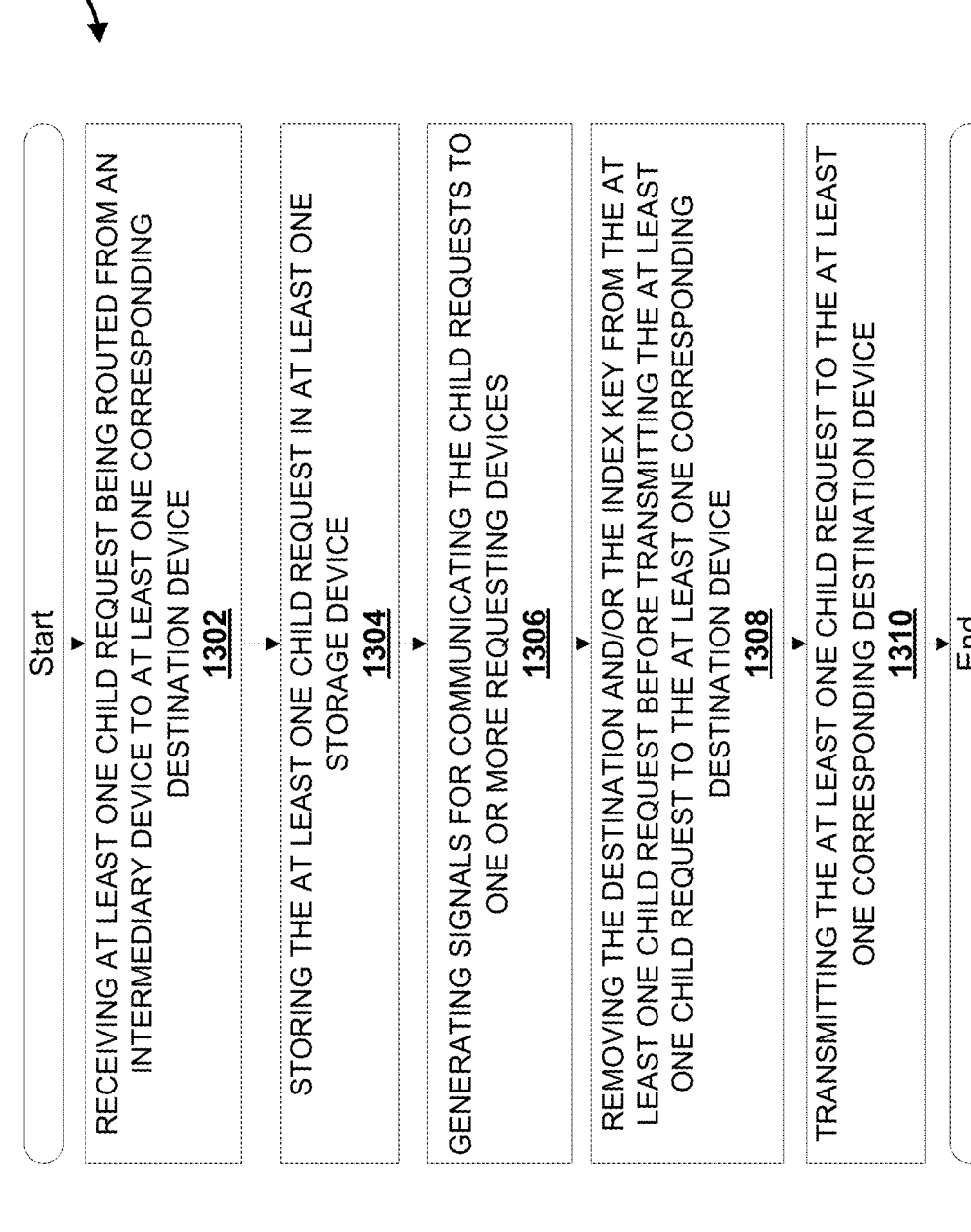

1300

Start

RECEIVING AT LEAST ONE CHILD REQUEST BEING ROUTED FROM AN INTERMEDIARY DEVICE TO AT LEAST ONE CORRESPONDING DESTINATION DEVICE
1302

STORING THE AT LEAST ONE CHILD REQUEST IN AT LEAST ONE STORAGE DEVICE
1304

GENERATING SIGNALS FOR COMMUNICATING THE CHILD REQUESTS TO ONE OR MORE REQUESTING DEVICES
1306

REMOVING THE DESTINATION AND/OR THE INDEX KEY FROM THE AT LEAST ONE CHILD REQUEST BEFORE TRANSMITTING THE AT LEAST ONE CHILD REQUEST TO THE AT LEAST ONE CORRESPONDING DESTINATION DEVICE
1308

TRANSMITTING THE AT LEAST ONE CHILD REQUEST TO THE AT LEAST ONE CORRESPONDING DESTINATION DEVICE
1310

End

FIG. 13

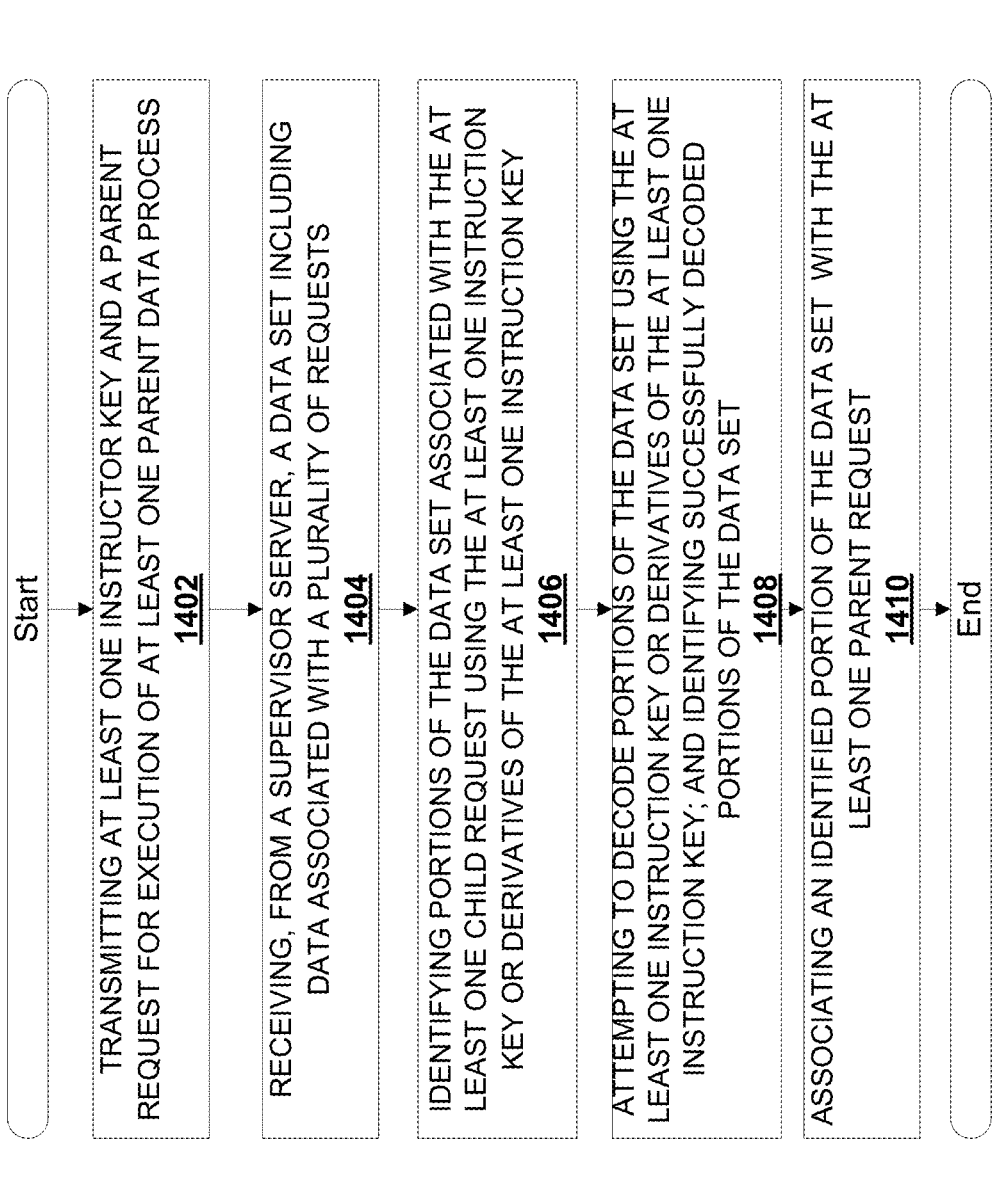

1400

Start

TRANSMITTING AT LEAST ONE INSTRUCTOR KEY AND A PARENT REQUEST FOR EXECUTION OF AT LEAST ONE PARENT DATA PROCESS
1402

RECEIVING, FROM A SUPERVISOR SERVER, A DATA SET INCLUDING DATA ASSOCIATED WITH A PLURALITY OF REQUESTS
1404

IDENTIFYING PORTIONS OF THE DATA SET ASSOCIATED WITH THE AT LEAST ONE CHILD REQUEST USING THE AT LEAST ONE INSTRUCTION KEY OR DERIVATIVES OF THE AT LEAST ONE INSTRUCTION KEY
1406

ATTEMPTING TO DECODE PORTIONS OF THE DATA SET USING THE AT LEAST ONE INSTRUCTION KEY OR DERIVATIVES OF THE AT LEAST ONE INSTRUCTION KEY; AND IDENTIFYING SUCCESSFULLY DECODED PORTIONS OF THE DATA SET
1408

ASSOCIATING AN IDENTIFIED PORTION OF THE DATA SET WITH THE AT LEAST ONE PARENT REQUEST
1410

End

FIG. 14

VERIFICATION OF DATA PROCESSES IN A NETWORK OF COMPUTING RESOURCES

CROSS-REFERENCE TO RELATED APPLICATIONS

This application is a continuation of U.S. patent application Ser. No. 17/843,839, filed on Jun. 17, 2022, which is a continuation of U.S. patent application Ser. No. 16/359,192, filed on Mar. 20, 2019, which is a continuation of U.S. patent application Ser. No. 14/969,896, filed on Dec. 15, 2015, which claims all benefit, including priority, of U.S. provisional patent application No. 62/091,971, filed Dec. 15, 2014, and entitled "SYSTEM AND METHODS FOR ORDER ROUTING VERIFICATION" and U.S. provisional patent application No. 62/151,182, filed Apr. 22, 2015, and entitled "SYSTEMS AND METHODS FOR SECURING ORDER INFORMATION".

All of these documents are hereby incorporated by reference in their entireties.

FIELD

The present disclosure relates generally to systems, methods, devices and media for the verification or management of data processes by various networked computing resources. In particular embodiments, the disclosure relates to the verification of data processes involving intermediate systems or devices.

Aspects of the material disclosed in this application relate to the holding, transfer, and/or administration of securities and other financial interests. Aspects of such holding, transfer, and/or administration may be subject to regulation by governmental and other agencies. The disclosure herein is made solely in terms of logical, programming, and communications possibilities, without regard to statutory, regulatory, or other legal considerations. Nothing herein is intended as a statement or representation that any system, method or process proposed or discussed herein, or the use thereof, does or does not comply with any statute, law, regulation, or other legal requirement in any jurisdiction; nor should it be taken or construed as doing so.

INTRODUCTION

In various forms of networked or otherwise distributed data processing systems, complex and/or multiple related processes based on client orders are often routed to multiple computing resources for distribution, dissemination or execution.

Some such distributed data processing systems concurrently handle high volumes of data processes for numerous clients. Instructions from different clients may involve similar data processes and may require the data processes to be communicated to and/or executed at computing resources without revealing any information regarding the original instructing client system.

In such an environment, verifying related data processes for a client can be a challenge.

SUMMARY

Aspects of the present disclosure provide systems, methods, and computer-executable instruction mechanisms (e.g., non-transient machine-readable programming structures)

such as software-coded instruction sets and data, for the management of data processing by multiple networked computing resources.

In particular, for example, the present disclosure provides systems, methods, and coded instruction sets useful to the verification or monitoring of orders or requests routed and/or being routed for processing by various networked computing resources.

In accordance with one aspect, there is provided a system for managing data processes in a network of computing resources. The system includes at least one processor configured to execute machine-interpretable instructions causing the system to: receive, from an instructor device, a parent request for execution of at least one parent data process executable by at least one computing resource; generate at least one child request for execution of at least one corresponding child data process for routing to at least one corresponding destination device, each of the at least one child data process for executing at least a portion of the at least one parent data process, and each of the at least one child request including a respective destination key derived from at least one instructor key; and route each of the at least one child request to the at least one corresponding destination device, whereby the at least one child request can be obtained by a supervisor server via the routing.

In accordance with another aspect, there is provided a system for managing data processes in a network of computing resources. The system includes at least one processor configured to execute machine-interpretable instructions causing the system to: receive at least one child request being routed from an intermediary device to at least one corresponding destination device, the at least one child request requesting execution of at least one corresponding child data process, each of the at least one child data process for executing at least a portion of at least one parent data process from an instructor device, and each of the at least one child request including a destination key derived at least in part from the at least one instructor key; store the at least one child request in at least one storage device; and generate signals for communicating the child requests to one or more requesting devices.

In accordance with another aspect, there is provided a system for managing data processes in a network of computing resources. The system includes at least one processor configured to execute machine-interpretable instructions causing the system to: transmit, to an intermediary device, a parent request for execution of at least one parent data process executable by at least one computing resource, the parent request for routing as at least one child request by the intermediary device for execution by at least one destination; receive, from a supervisor server, a data set including data associated with a plurality of requests; identify portions of the data set associated with the at least one child request using at least one instruction key or derivatives of the at least one instruction key; and associate an identified portion of the data set with the at least one parent request.

In accordance with another aspect, there is provided a method for managing data processes in a network of computing resources. The method includes: receiving, at an intermediary device from an instructor device, a parent request for execution of at least one parent data process executable by at least one computing resource; generating at least one child request for execution of at least one corresponding child data process for routing to at least one corresponding destination device, each of the at least one child data process for executing at least a portion of the at least one parent data process, and each of the at least one child request including a respective destination key derived from at least one instructor key; and routing each of the at least one child request to the at least one corresponding destination device, whereby the at least one child request can be obtained by a supervisor server via the routing.

In accordance with another aspect, there is provided a method for managing data processes in a network of computing resources. The method includes: receiving at least one child request being routed from an intermediary device to at least one corresponding destination device, the at least one child request requesting execution of at least one corresponding child data process, each of the at least one child data process for executing at least a portion of the at least one parent data process from an instructor device, and each of the at least one child request including a destination key derived at least in part from the at least one instructor key; storing the at least one child request in at least one storage device; and generating signals for communicating the child requests to one or more requesting devices.

In accordance with another aspect, there is provided a method for managing data processes in a network of computing resources. The method includes: transmitting, from an instructor device to an intermediary device, a parent request for execution of at least one parent data process executable by at least one computing resource, the parent request for routing as at least one child request by the intermediary device for execution by at least one destination; receiving, from a supervisor server, a data set including data associated with a plurality of requests; identifying portions of the data set associated with the at least one child request using at least one instruction key or derivatives of the at least one instruction key; and associating an identified portion of the data set with the at least one parent request.

In accordance with another aspect, there is provided a non-transitory computer readable medium for managing data processes in a network of computing resources. The non-transitory computer readable medium includes machine-interpretable instructions, which when executed, cause at least one processor to: receive, at an intermediary device from an instructor device, a parent request for execution of at least one parent data process executable by at least one computing resource; generate at least one child request for execution of at least one corresponding child data process for routing to at least one corresponding destination device, each of the at least one child data process for executing at least a portion of the at least one parent data process, and each of the at least one child request including a respective destination key derived from at least one instructor key; and route each of the at least one child request to the at least one corresponding destination device, whereby the at least one child request can be obtained by a supervisor server via the routing.

In accordance with another aspect, there is provided a non-transitory computer readable medium for managing data processes in a network of computing resources. The non-transitory computer readable medium includes machine-interpretable instructions, which when executed, cause at least one processor to: receive at least one child request being routed from an intermediary device to at least one corresponding destination device, the at least one child request requesting execution of at least one corresponding child data process, each of the at least one child data process for executing at least a portion of at least one parent data process from an instructor device, and each of the at least one child request including a destination key derived at least in part from the at least one instructor key; store the at least one child request in at least one storage device 110; and generate signals for communicating the child requests to one or more requesting devices.

In accordance with another aspect, there is provided a non-transitory computer readable medium for managing data processes in a network of computing resources. The non-transitory computer readable medium includes machine-interpretable instructions, which when executed, cause at least one processor to: transmit, from an instructor device to an intermediary device, a parent request for execution of at least one parent data process executable by at least one computing resource, the parent request for routing as at least one child request by the intermediary device for execution by at least one destination; receive, from a supervisor server, a data set including data associated with a plurality of requests; identify portions of the data set associated with the at least one child request using at least one instruction key or derivatives of the at least one instruction key; and associate an identified portion of the data set with the at least one parent request.

Many further features and combinations thereof concerning embodiments described herein will appear to those skilled in the art following a reading of the instant disclosure.

DESCRIPTION OF THE FIGURES

In the drawings, embodiments of the invention are illustrated by way of example. It is to be expressly understood that the description and drawings are only for the purpose of illustration and as an aid to understanding, and are not intended as a definition of the limits of the invention.

FIG. 12 is an example workflow showing aspects of an example method from an intermediary perspective.

FIG. 13 is an example workflow showing aspects of an example method from a supervisor perspective.

FIG. 14 is an example workflow showing aspects of an example method from an instructor perspective.

DETAILED DESCRIPTION

In a networked or distributed data processing system, an instructing device may send a data processing request to an intermediary device for executing the data processing request at one or more destination device. For example, in one embodiment, an instructing device may send a request to execute a computer workload to a distributed resource manager for execution on one or more distributed resources. In another example, an instructing device may send a request to execute a financial trade to an intermediary device such as an electronic brokerage for execution on one or more networked electronic trading devices.

In some embodiments, the intermediary devices can have the instructing device's data processing request executed at any number of distributed data processing resources. In some situations, when the intermediary devices are part of or comprise independent systems from the client devices, the intermediary devices may make decisions regarding the execution of the instructing device's data processing request without any direct oversight from the client device. In some instances, an entity associated with the intermediary device may have different or conflicting motivations from an entity associated with the instructing device. For example, a distributed resource manager which handles workloads from multiple instructing devices may be configured to split data processing resources across workloads from many instructing devices while a particular instructing device would prefer that all resources were dedicated to the instructing device's workloads.

Similarly, an electronic brokerage system may benefit from different commissions, rebates, execution of trade requests from preferred or more profitable instructing devices. These motivations may affect the manner in which an intermediate device is configured to handle data processing requests which may not be aligned with the instructions or best interests of an instructing device.

In broad terms, in some embodiments, the present disclosure provides systems, devices, methods and media for verifying or otherwise managing the execution of data processes in a network of computing resources. In some instances, this verification may provide an indication as to the performance of an intermediary device in the execution of an instructing device's data processing request and/or information related to how the intermediary has apportioned and/or routed the request to one or more computing resources.

In some embodiments, aspects of the systems, devices, methods and media described herein may provide for anonymity for information relating to data processing requests from different instructing devices. In some instances, aspects of the present disclosure may reduce the likelihood that a third party may be able to glean information relating to data processing requests from an instructing device.

Figure 1A:
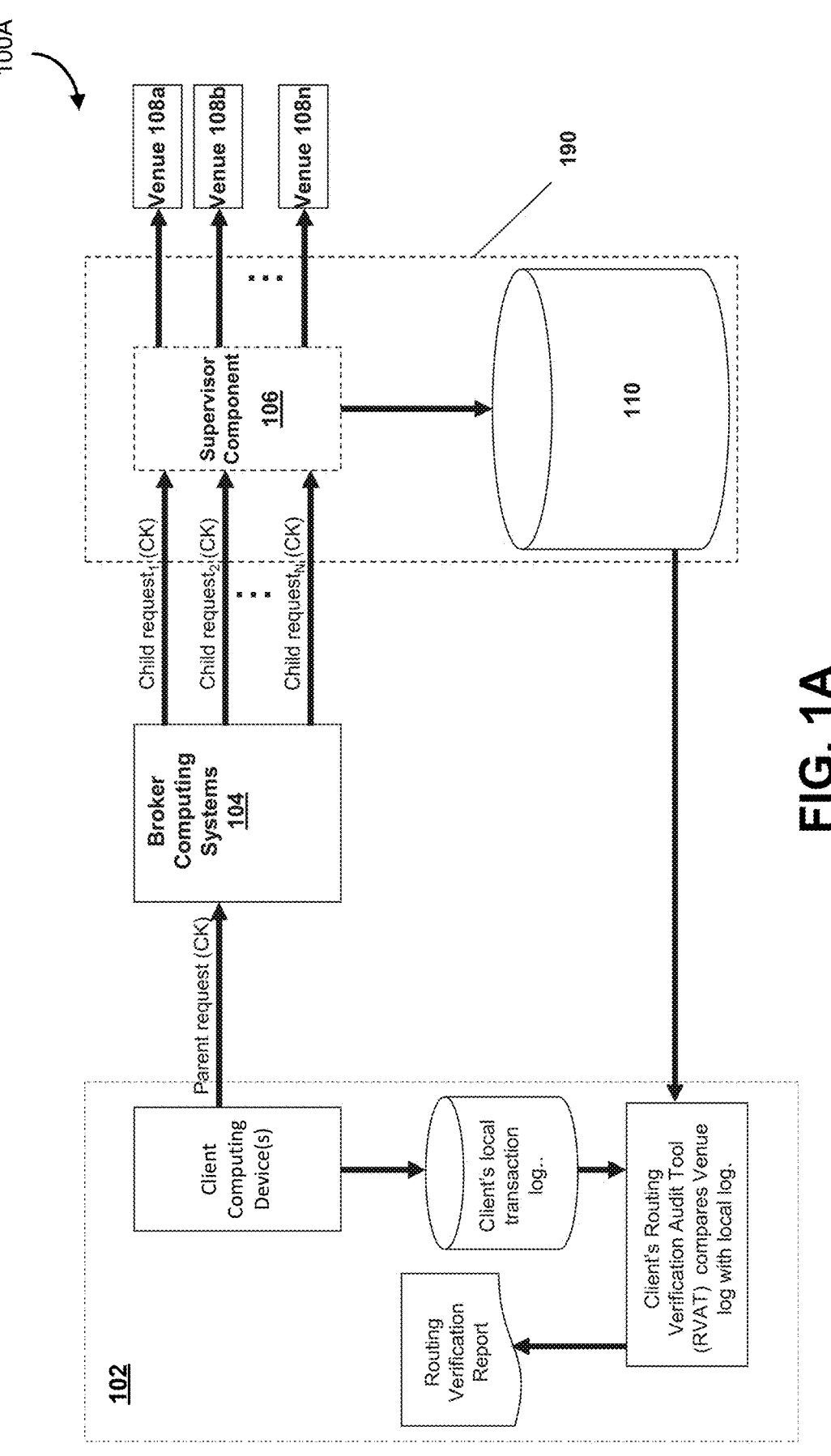
FIGS. 1A and 1B show aspects of an example system and workflow for managing data processes in a network of computing resources.

FIG. 1A shows aspects of an example system 100A for verifying or otherwise managing data processes in a network of computing resources. In some embodiments, the system 100 can include one or more instructor systems such as the client computing systems 102 in FIG. 1A. An instructor system can include one or more instructor (client computing) devices configured for transmitting a data processing request (for example, a parent request) to a second system (for example, broker computing systems 104). The data processing request can, in some examples, be executed by one or more computing resources (for example, electronic trading venues 108*a* . . . n).

In some embodiments, the data processing request can be a request or other message which includes data including one or more parameters or requirements defining the data process that the instructor system seeks to have executed. The instructor system 102 may also be configured to maintain a transaction log (e.g., held within a database or various computer readable data storage devices).

The second system can, in some examples, be an intermediary system configured to receive the data processing request from the instructor system; generate one or more child requests, each for executing at least a portion of the received data processing request; and routing the child request(s) for execution by one or more computing resources. In some embodiments, the intermediary system may be an electronic broker, a distributed resource management system, or any other system or device which may act as an intermediary, agent, proxy or node for having the data processing request executed.

It should be understood that the term "system" as referenced for example as instructor systems, intermediary systems, supervisor systems, client computing systems, broker computing systems, etc. may refer to one or more devices, systems, communication links, or some combination thereof. In some examples, a single physical device may include aspects of multiple systems, for example, a single computing device may running a data process for a first system, and also host a server for a second system.

Conversely, the term "device" or "server" can refer to a single device, multiple devices, communication links, systems, computer process, or any combination thereof.

The terms "instructor", "intermediary" and "destination" systems and devices refer to the relationships between the various components in the overarching system. For example, a broker computing system 104 may be an intermediary system for a client instructor computing system 102; however, for a multi-hop process, the broker computing system 104 can also be an instructor system that sends a request to an intermediary second broker system. Similarly, the second broker system can be a destination device from the perspective of the instructor system, and may also act as an intermediary for the first broker system.

In some embodiments, instructor, intermediary, destination and supervisor systems and devices may refer to electronic components within a single system such as the broker computing system 104. For example, as described herein or otherwise, the broker computing system may include multiple internal computing components such as smart routers which may be referred to as instructor, intermediary, destination and/or supervisor systems/devices.

Aspects of the systems and methods described herein may be applied in various fields, for example, financial trading.

For example, an electronic trading data processing request can include interest identifier(s) (such as an identifier used by one or more exchanges to identify a stock, a Committee on Uniform Securities Identification Procedures (CUSIP), a set of currencies to be exchanged, etc.), a quantity value (e.g. amounts or volumes) of the interest(s) to be transacted (including for example any total and/or reserve quantities), an execution type (e.g. buy, sell, bid, offer, etc.) to be executed or requested, time-in-force (e.g., good-til-canceled, immediate or cancel, fill or kill), and corresponding price terms. In some examples, the data processing request may include data indicating specific requirements and/or preferences for executing the data process such as preferred or required computing resources to use, limits on number of child data processes that can be generated from the original request, routing instructions, timing parameters, and any other instructions for executing the data process and/or instructing an intermediary system.

In another example, a workload data processing request may be sent from an instructor system to an intermediary distributed resource management system for execution on one or more distributed resources managed or accessible by the intermediary system.

In other examples, the systems and methods described herein may be applied to other fields where instructions/ orders are routed between various entities, and an overall instructor or intermediary may wish to validate and/or verify such routing took place in a manner that is consistent and/or in the interests of the instructor or intermediary. While various embodiments are described in relation to financial trading (e.g., having a client-broker-venue terminology), other applications may be utilized, wherein a client-inter-mediary-destination terminology may be more applicable. For example, the client may be the "instructor" in such a case, and the intermediary/destinations may be one or more agents of the "instructor" that may carry out various tasks and/or route to other agents. There may be various levels of intermediaries, etc., such as multiple levels of brokers and/or routing components within individual brokers.

Information and/or instructions may be provided in the form of data processes, which may be routed across various communication links, such as a network of computing resources wherein the computing resources may be config-ured to perform various functions, e.g., through the execu-tion of machine interpretable instructions.

In the context of a client-broker-venue financial trading application, the system may comprise a client system, a broker system, a supervisor system and one or more venues (data processing resources for financial trading). A client system may submit a request to a broker system for one or more financial transactions to occur. The client request may be denoted as a parent request, which may be transmitted to a broker system, which may be configured to provide one or more related child requests to cause the routing of one or more financial transactions.

The client request may be denoted as a parent request, which may be transmitted to a broker system, which then provides one or more related child requests to cause the routing of one or more financial transactions.

Routing of the one or more financial transactions may be conducted in the context of processing the one or more financial transactions by one or more venues. There may be requests that are, for example, executed, partially filled, cancelled, rejected, acknowledged, etc.

In some situations, an instructor system 102 and an intermediary system 104 may be operated by different entities or may be otherwise configured to operate using rules based on competing interests. As the intermediary system 104 may have some discretion or options for routing a parent request for execution by one or more computing resources.

For example, when a parent request includes a data process related to financial transactions, an intermediary broker computing system may have a number of available options to route the request for execution or otherwise process the request. In some jurisdictions, regulations may stipulate that brokers should route client orders in view of the customer's interests (e.g., getting the best price for the customer) and brokers should follow the clients' explicit routing instructions (e.g., best price, best execution, the use of latency levelling routing techniques). However, based on the complexity and anonymity built into current systems, verification that a client's instructions or best interests were followed is difficult or impossible. Moreover, in some situ-ations, an instructor system's instructions can be met while still allowing for some discretion for the broker system.

In some situations, a broker system may be incentivized to route orders in a manner that may be beneficial to the broker, but may not be optimal to the instructor's interest. For example, one or more financial trading computing resources may be associated with exchanges which offer rebates and/or other incentives to brokers to execute trades on their exchange. In this scenario, a broker system may be incentivized to route at least a portion of a request to a computing resource to collect a rebate offered by the cor-responding exchange.

In some other scenarios, a broker system may route orders to other brokers and receive additional payments when selling order flow to various trading firms. For example, some venues provide a rebate to boost trading volumes and implement rebate schemes such as a "maker-taker system". A rebate may be provided to a broker for "making" a market, and conversely, a fee may be charged to a broker for "taking" a market. Other rebate schemes may be contem-plated.

A potential conflict may arise when a broker has an option to route a processing request to a computing resource offering a rebate, but the computing resource offering the rebate may not be provide the best execution for the instruc-tor. Other conflicts may also be contemplated (e.g., brokers delegating orders sub-optimally to other brokers, or doing so in an inefficient manner).

For example, a computing resource providing broker rebates may have long execution times or latencies, lower fill rates, or may be more likely to be subject to predatory (e.g. high frequency) traders.

The specific methodology and/or performance of a par-ticular broker may also be of importance to a client. For example, a client may wish to compare one broker's per-formance with another, choosing to provide more orders to the broker that appears to have stronger performance than another broker.

As an instructor's request may be sent via multiple intermediary systems, may involve many independent rout-ing components and computing resources, and the genera-tion of various child and grandchild requests, it may be difficult or impossible to view, verify, validate, manage or otherwise monitor the routing of a client request. Moreover, it may be difficult to determine whether the resultant price/ quantity obtained on the client's request was favorable for the client in view of prevailing market conditions, whether the broker system met performance standards, or whether the broker followed instructions set out by the client request.

Another factor in the management or monitoring of networked computing resources is the ability to maintain confidentiality of an instructor system's data processing in relation to third parties. For example, the relationship between broker orders and client orders may be used by a third party for determining various characteristics and/or aspects of the orders, including the identity of the parties, trade request information, algorithms used, how orders are split and routed, the relationship between orders, etc. The leakage of this information may have potential deleterious impacts on fill rates and the future effectiveness of the routing strategy and/or algorithm, as the third party may then be able to make opportunistic trades based on this information. Clients may be particularly sensitive to any leak of portfolio strategy or position.

In broad terms, in some embodiments, the present disclosure provides systems, devices, methods and media for verifying or otherwise managing the execution of data processes in a network of computing resources. In some instances, this verification may provide an indication as to the performance of an intermediary device in the execution of an instructing device's data processing request and/or information related to how the intermediary has apportioned and/or routed the request to one or more computing resources.

In some embodiments, aspects of the systems, devices, methods and media described herein may provide for anonymity for information relating to data processing requests from different instructing devices. In some instances, aspects of the present disclosure may reduce the likelihood that a third party may be able to glean information relating to data processing requests from an instructing device.

Aspects of some embodiments may involve the configuration and/or provisioning of a computerized system for supervising the routing of orders, where the supervisory function may be conducted through the use of one or more keys that may be associated with the routed orders.

These one or more keys may be secured, encoded, truncated or otherwise obfuscated such that the keys do not impact the confidentiality of the request or information associated with the requests. In some embodiments, the keys may be used to encode request data and metadata.

With reference to FIG. 1A, an instructor system such as client computing system 102 includes one or more processors which can be distributed across one or more devices. The processors are configured to transmit to an intermediary system (such as broker computing system 104) a parent request. The parent request can include at least one parent data process which can be executed by one or more computing resources (such as venues 108a . . . n).

In some embodiments, instructor processor sends an instructor key (CK) to the intermediary computing system in conjunction with the parent request. The instructor key and the parent request can be sent in the same message. For example, the instructor key may be a tag or a value stored in a header or other field associated with the parent request message. In another example, the instructor key and parent request may be sent in multiple messages using any mechanism in which the intermediary computing system can correlate the two.

In some examples, the instructor key (CK) may be generated in any manner as described herein or otherwise. In some embodiments, the instructor key (CK) may be unique to the particular parent request with different instructor keys being generated for different requests and for sending to different intermediary devices.

The intermediary system such as broker computing system 104 can include one or more processors which can be distributed across one or more devices. The processors are configured to receive the parent request and the instructor key CK.

The intermediary system processors generate one or more child requests for routing to one or more destination devices. The child requests include child data processes for executing at least a portion of the parent data process. For example, a parent request may include a data process to execute a trade for 10,000 shares of stock ABC, and the processors can generate multiple child requests to execute portions of the 10,000 shares at different destination devices (such as computing resources at stock exchanges, other brokers, dark pools, etc.). In another example, a parent request may include a data process to calculate 10 billion computations, and the processors can generate multiple child requests to execute potions of the 10 billion computations at different destination devices (such as shared or distributed computing resources, or other cloud computing servers or distributed resources management systems). Each child request can include or otherwise be associated with the instructor key CK.

The intermediary processors are configured to route each child request to a corresponding destination device 108 in conjunction with the instructor key CK (which, in this example, may also be referenced as a destination key).

The system 100A includes a supervisor server or system 190 which obtains the child requests via the routing of the child requests from the intermediary system 104 and the destination devices. The supervisor server can obtain the child requests via one or more supervisor devices 106.

In some examples, the supervisor devices 106 may include one or more listening devices which are configured to tap, listen, scrape, or otherwise access communications on a route between the intermediary system 104 and the destination devices. For example, the listening devices may include sniffers, taps, interceptors, monitors, collectors, scrapers, and the like which may obtain child request data in a real-time, delayed and/or bulk manner. In some examples, the listening device may be a physical device such as a tap device on a physical communication link. In other examples, the listening device may be a process executing on a processor at a network node which can listen to and transmit copies of child request data to a supervisor server 190. In some embodiments, the supervisor system receives the intercepted from an existing listening device, and in some embodiments, the supervisor system includes the listening device.

In some examples, the supervisor devices 106 may include a proxy or intermediary device which receives child requests and routes the requests to both the destination devices and the supervisor system 190.

In some embodiments, the supervisor devices 106 may be configured to remove child or destination key information from the child orders, reformat, and/or apply any intermediate processing instructions from the intermediary or instructing device before routing the child request on to the destination devices (for example, if the destination has strict requirements as to how information is formatted and/or provided such that additional elements of information would cause the information not to be in compliance with the requirements of the destination (e.g., a venue that only accepts messages having a strict schema and rejects other messages as being malformed).

In some embodiments, the destination devices 106 may be able to process, ignore or otherwise handle destination key information included in child orders, so supervisor devices 106 may allow child requests to be routed to the destination devices 106 with the destination keys intact.

While the supervisor server 190 is illustrated as a separate system, in some examples, the supervisor server 190 may be one or more processes or devices operating at an intermediary system and/or a destination device. For example, in some embodiments, the supervisor system may include be a process (or device) running at the intermediary system which listens to or handles child requests as they are being routed from the intermediary system.

In another example, the supervisor system may include a process or device operating at the destination device such as a stock exchange computing resource. In some examples, the computing resources themselves, such as stock exchange computing resources, may be configured to handle destination keys and may send both child requests and response messages to the supervisor system in conjunction with the destination keys.

In some examples, the supervisor system may be a distributed system with components at or otherwise integrated with instructor, intermediary and destination systems.

The supervisor system 190 may receive and store child request data and data associated with the child requests in one or more data storage devices 110. In some embodiments, the supervisor system may collect, collate, reformat or otherwise process the received data so that it is suitable for storage and access.

The supervisor system 190 stores the received request data in conjunction with corresponding destination key(s). For example, in FIG. 1A, the data associated with each child request 1 . . . N is stored in conjunction with destination key CK.

In some embodiments, the data associated with a child request can be encoded with the destination key or some derivative thereof.

In some embodiments, in addition to child request details (e.g. request to process order for 100 shares of ABC to venue 108*a*), the data associated with a child request can also include metadata. In some examples, the data associated with a child request can include one or more timestamps of when the child request was received/sent/forwarded by the supervisor system.

In some examples, the data associated with a child request can include an identifier for identifying a mechanism by which the child request data was obtained by the supervisor. For example, the identifier may indicate that the child request data was obtained via a listening device or proxy device. In some instances, the identifier may provide an indication of whether the child request data was obtained live (e.g. via a tap device), or with a potential delay (e.g. in batches) to potentially assess the accuracy of any timestamps.

In some instances, the identifier may indicate whether the child request data was received independently by the supervisor system (e.g. by a tap device) or via a drop-copy or other mechanism via the intermediary system. This may, in some examples, provide an indication as to a level of trust or a degree to which the data has the potential to be manipulated by the intermediary device.

In some examples, meta data associated with a child request can include time/data information, type of transaction in the request (e.g. equity, option, bonds, etc.), type of message in the request (e.g. buy, sell, quote, acknowledge, etc.), protocol information, region, information required to interpret the message, or any other information for classifying or otherwise relevant to a request.

In some embodiments, the child request data can include data from one or more response messages from the destination devices(s) 108 associated with the corresponding child requests. For example, the response messages can include acknowledgements, rejection, executions, confirmations, open orders, etc. In some examples, the data can include fill rates, prices, volumes, or any other data suitable for evaluating or monitoring the executing of a data processing request.

The supervisor system processor(s) can be configured to communicate stored child request data to one or more requesting devices. In some examples, requesting devices may be associated with an instructing system 102, a regulatory body, or any other entity.

In some embodiments, the supervisor system processor(s) can be configured to broadcast or otherwise make request data available publicly.

In some embodiments, the supervisor system can be configured to push request data to requesting devices as it becomes available. In other embodiments, the supervisor system can be configured to only send data when a requesting device explicitly requests it (pull). Combinations and variations of this are possible.

In order to preserve confidentiality, in some embodiments, the supervisor system may only send child request data corresponding to destination key(s) provided by the requesting device.

In embodiments where the supervisor system encodes the received request data with the corresponding destination keys, the supervisor system may broadcast or otherwise send all encoded data to any number of requesting devices. In some embodiments, the requesting devices can decode only the encoded data corresponding to a destination key possessed by the requesting device. For example, the instructor system 102 which has stored the instructor key CK and knows it is associated with the particular parent request can identify the portions of the encoded data which are associated with child orders based on the parent order because they are the only portions which can successfully decoded with the instructor key CK.

In some embodiments, the supervisor system may be configured to only encode portions of the data associated with a request. For example, region metadata or type of transaction metadata may be stored unencrypted. In some examples, unencrypted portions of data can be used as a parameter which a requesting device can use to reduce the set of data that is received in a request.

As illustrated by this example and throughout, the present disclosure can, in some embodiments, provide process, systems and particular technical interactions between systems which provide for a virtual trail of breadcrumbs or key(s) which may allow for the monitoring or management of a parent request and associated child requests as they are apportioned by different computing systems for executing at a computing resource.

There may be several approaches available. For example: (1) the client may provide a key to a broker for use in relation to the client's orders, (2) a broker may create a key to be provided back to the client, and (3) a broker may create a broker specific key and utilize a combination of the broker specific key and the client key in securing information. In some embodiments, the client key may be considered an "instructor key", and the client's computing device may be considered the "instructor device".

The example system 100A of FIG. 1A illustrates one possible embodiments verifying the routing of client requests. However, as illustrated in part by the following discussion there may be different technical implementations which may have different trade-offs in terms of processing speed, computational requirements, completeness of data, levels of confidentiality between the systems, etc.

Considerations may include trade-offs between robustness of tracking (especially in more complex topologies where there may be multiple levels of intermediary systems, or distribution of parent requests across computing components within an entity, for example, different routing engines within a single broker system) and the need for computational performance within a particular threshold (e.g., in a trading system where prices and execution opportunities may be fleeting, millisecond delays for key processing may not be acceptable) and interoperability (e.g., some brokers in a series of brokers may be configured to interoperate with a supervisor, while others may not be).

It may not be desirable to reveal a relationship between an instructing system and the child orders associated with its parent request to a computing resource (e.g. such that an exchange only has knowledge of which orders came from a particular broker but does not know which client system each order corresponds to) or to a third party. Similarly, an intermediary system (e.g. a broker computing system) may not wish to reveal to a destination how parent requests are routed and processed through an algorithmic or smart order router (SOR).

In some embodiments, a technical problem to be solved may include how to manage data (or identifiers thereof) travelling in a networked computing system so as to not expose an instructor system's identity, an intermediary system's routing algorithm, or relationships between child requests, while still providing for a supervisor (as described herein) and/or computing resource to process or execute the respective child requests, and while providing for the instructor system to verify the intermediary's activities with respect to an instructor request. Third parties should be prevented from retrieving, reconstructing, or mining an instructor and/or intermediary's request and processing history. In a financial system, exposing request data may pose risks to the instructor or the intermediary's proprietary and/or confidential information, such as trading and/or routing strategies, preferred venues, order information, etc.

Potential advantages associated with some embodiments may include the verification of client orders with minimal and/or reduced exposure of identities, activities and/or strategies; the verification of instructor requests without unduly revealing intermediary strategies and/or algorithms; and the ability to conduct verification and/or correlation across a large number instructor requests.

However, the verification of instructor requests in a secure fashion may require a level of ease and convenience to implement. There may be various advantages associated with utilizing existing communication infrastructure and/or without the need to deploy significant security infrastructure. For example, in some embodiments, there may be no need for a certificate authority.

Some embodiments described throughout this specification may provide architectures, systems, methods and/or computer system products that may offer some or all of the following potential benefits:

there may be flexibility in the implementation and/or structure of the architecture and system, as the embodiments may be suitable for use with various permutations and combinations of instructor/intermediary/destination relationships;

the use of a verifiable transaction log which may be generated by an independently operating supervisor system and which, in some embodiments, may be helpful in various aspects, such as responding to audit inquiries, automatic reviews and/or reports on order routing characteristics, etc.;

some embodiments do not require significant integration by computing resources (e.g. financial trading venues), which may be significant depending on the number of destinations contemplated;

some embodiments include integration by computing resources, which may reduce/avoid the need for the implementation of a supervisor system;

various encoding and/or encryption methods may be suitable for use—for example, digital signatures, simple codes, basic cipher/key pairs, the RSA algorithm, pseudo-random number generation, etc., can be used as between client/broker/venue;

in some embodiments, the parameters of the secure keys have been designed such that privacy is provided, (e.g., in some embodiments, even if using well known hash functions); and in some embodiments, the systems, architectures and methods described throughout the specification may be developed in view of the need for manageable file sizes, computational complexity, and/or computational times in order to, for example, maintain communications that are manageable and/or security that is computationally feasible (e.g., resources are limited by the amount of time available and computational processing power; in some contexts, every nano/microsecond counts, while in others, it may be important that processing be conducted responsively to ensure relevancy of analysis).

Instructor systems may be associated with various entities that may generate requests, such as individual clients, financial institutions, hedge funds, pension funds, sovereign wealth funds, corporations, partnerships, sole proprietorships, institutional investors, etc.

Intermediary systems may be associated with various entities that may arrange one or more financial transactions based on client orders, such as a stockbroker, a brokerage firm, a registered representative, an investment advisor, a wirehouse, a broker-dealer, among others. Broker computing systems may send requests to destination devices directly or indirectly through other intermediary systems.

Destination devices may include computing resources which may be associated with various stock exchanges, alternative trading systems (ATS), dark pools, multilateral trading facilities, crossing networks, national exchanges, regional exchanges, electronic communication networks, simple dealer platforms, or other registered or unregistered venues, etc.

In some examples, request information may be communicated through a variety of techniques and/or protocols, such as the Financial Information Exchange (FIX) protocol, text files, flat files, database files, binary files, character strings, etc. Information may be communicated, for example, using various proprietary protocols and/or binary protocols, such as those being used by exchanges and/or venues.

In some embodiments, data can also be encrypted prior to communication to provide another level of security. The architecture may utilize various schemes to encrypt data, such as public/private key pairs, etc.

It should be understood that the variations of different aspects of the example systems, devices, methods and media described herein may be applied, where suitable, to any of the other embodiments in any permutation or combination.

Figure 1B:
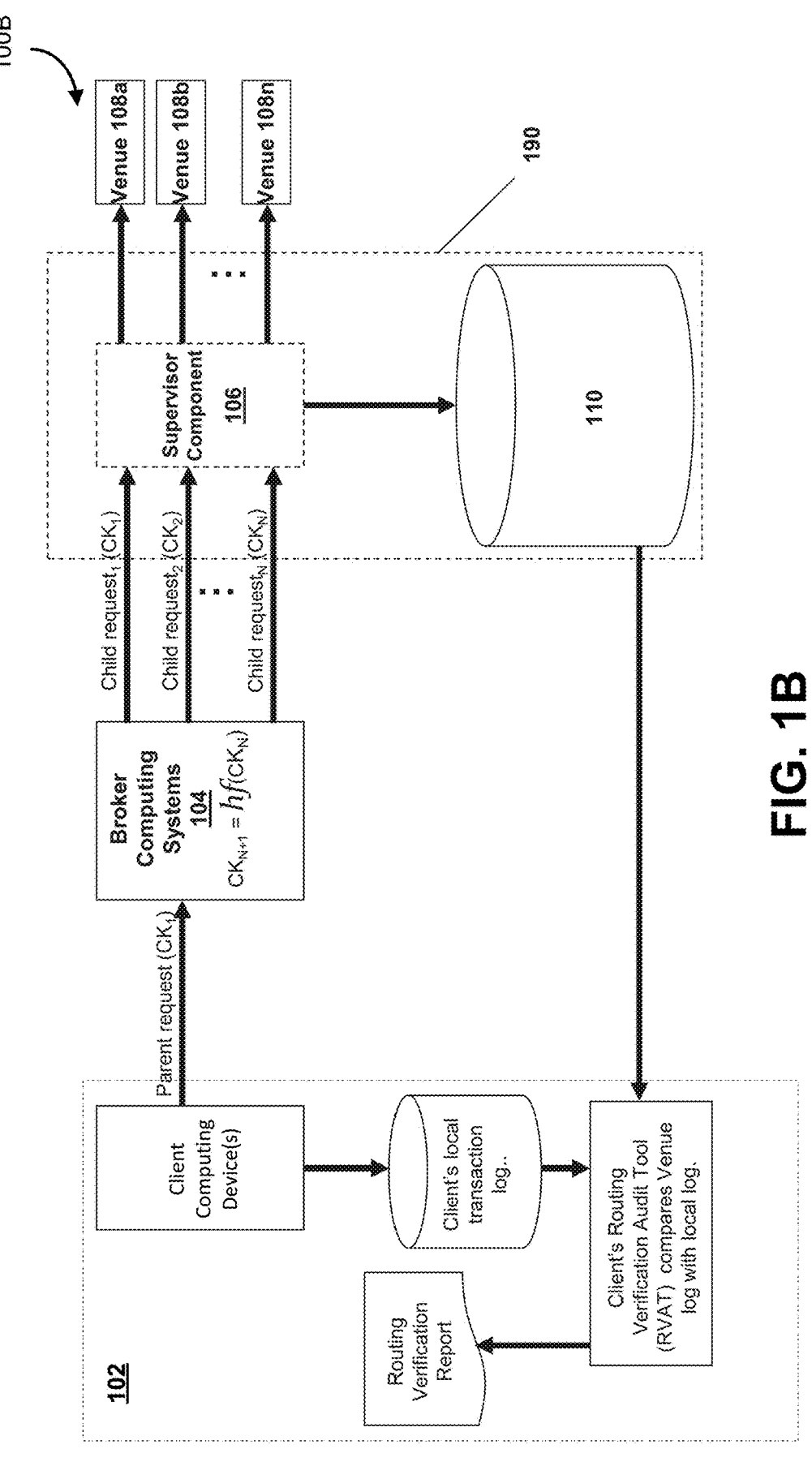

FIG. 1B shows aspects of another example system 100B and dataflow for managing data processes in a network of computing resources.

Similar to the example of FIG. 1A, in FIG. 1B, an instructor system 102 sends a parent request to an intermediary system 104 in conjunction with an instructor key $CK_1$. However, rather than generating child requests each having the same destination key CK as in FIG. 1A, the intermediary system 104 in FIG. 1B selects a sequence of destination keys $(CK_1 \ldots CK_N)$ and associates each destination key with one of the child requests.

In some embodiments, selecting the sequence of destination keys can include generating the second and subsequent destination keys in the sequence by applying a encoding function such as a hash function hf( ) to the previous key in the sequence.

In this manner, the data associated with each child request is stored and/or encoded with a different but related destination key.

In some embodiments, any of the encoding functions described or illustrated herein (e.g. $hf_1$, $hf_2$, $hf_3$) can include any function or algorithm which generates a pseudorandom string based on an input such that the same input will result in the same pseudorandom string output. By repeated applying the encoding function to the pseudorandom string output, a sequence of keys can be generated or re-generated. In some examples, the encoding function can produce an output having a defined length based on any input.

A requesting device such as the instructor system 102 can access and/or decode each child request by recreating the sequence of destination keys by applying the same encoding function used by the intermediary device to the instructor key which it sent in conjunction with the parent request.

To identify the child request data associated with the parent request, the instructor system can send request(s) including each of the recreated destination keys to receive a data set including child request data corresponding to those keys. Alternatively or additionally, the requesting device can attempt to decode a public or more broadly available data set from the supervisor system using the recreated destination keys and associated successfully decoded portions with the parent request.

Since the requesting device may not know how many child requests were generated by the intermediary device, the requesting device can be configured to continue requesting and/or decoding data sets associated with additional destination keys in the sequence until the entire parent data processing request is accounted for.

In some instances, the application of different destination keys can obfuscate the relationship between child requests to the destination device(s) and/or third parties accessing data from the supervisor system.

In other embodiments, other destination key selection techniques can be used. For example, rather than a hash function being shared or commonly known between the instructor and intermediary systems, in some embodiments, the two systems may share a random number generator or set of random numbers, and destination keys can be generated based on a seed or index communicated with the parent request.

Other mechanisms whereby keys appear uncorrelated to a third party but can be used by the intermediary and/or instructor to identify or generate related keys may be used.

In some embodiments, the keys may be generated using various techniques, such as cryptographic techniques, hashing functions, encryption key pairs, individually or in combination. In some embodiments, the keys are generated using various combinations and/or permutations of different techniques, along with the application of various further obfuscation techniques, such as padding, salting, etc.

The keys (e.g., "breadcrumbs" or random sequences of symbols) and/or encoding/encryption techniques, in some embodiments, may have cascaded and/or successively sequenced (e.g., derived "derivatives") encoding performed on them such that properties of layered encoding may be advantageously utilized. For example, a particular "seed" key may be re-encoded (e.g. re-hashed) with an encoding function repeatedly to generate various related keys that would be difficult for a third party to reproduce without knowing the "seed" or a key within the chain of keys, and/or the encoding technique utilized (and salts/padding schemes thereof). Similarly, more than one key may be combined together to create "child keys" from more than one "seed" key at each level, further obfuscating the ability for third parties to identify associations. Such keys may be considered "index keys", and for example, may be generated using an "instructor key" (e.g., a key provided by a client) and an "intermediary key" (e.g., a key provided by a broker).

In some embodiments, the destination keys may, for example, be established by selecting (and/or generating) a sequence of keys from a pool of available keys, selected based on a particular methodology and/or method. Such methodology and/or method may, in some embodiments, be shared between a supervisor system, an instructor device (e.g., a client device), broker devices, etc.

Cryptographic techniques utilized include both encryption and/or the use of secure hashing. Various one way and/or two way functions may be utilized, for example, in some embodiments, ciphertext can be processed to derive the originating string, while in other embodiments, the ciphertext cannot be used to derive the originating string (e.g., a one-way hash function, where attempts to reverse the hash function from a result such as a checksum may yield one or more colliding results). As examples, cryptographic functions may include secured hash algorithms (SHA), the message-digest algorithm (MD), etc.

The selection of a cryptographic technique may be of importance depending on the number of possible inputs expected and outputs required. For example, hash collisions may lead to inaccurate verification results or additional processing.

Keys may, for example, be comprised of a series of codes (e.g., random numbers) that may be pre-generated and shared between a client and a broker. The broker may associate an output order or instruction set that is generated by the broker using the code in accordance with its design. In some embodiments, the code is simply a set of pre-defined generated numbers that are shared between a broker and a client. The numbers may be random (e.g., both parties may share code books) chosen based on a cipher and/or mathematical algorithm, etc., and provided in the form of look-up table. A potential weakness with such an approach may be an ease of decryption and/or malicious access in view of modern code-breaking, and code-predicting techniques (e.g., brute force attack using a dictionary). However, pre-generated keys can reduce computation times required to select/generate destination keys. It is not uncommon for a parent request to be apportioned into thousands of child requests, and the on-the-fly sequential generation of destination keys may result in delays which are not acceptable especially for time sensitive data processing requests such as requests for financial trades. To increase security, sequences of pre-generated keys may be changed periodically, and the generation of these keys can, in some embodiments, be performed in off-peak times or hours when trading requests are not processed.

In some embodiments, the system 100B may use a single initial master CK per instructor and continue to use subsequent keys in the master CK sequence for subsequent orders. In some embodiments, that system 100B may use a separate CK per parent request. In order to reduce the amount of data traffic between instructor and intermediary, only a single CK may be communicated between the instructor and intermediary systems from which the receiving system may determine any and all child keys based on the single CK. In some examples, the intermediary system may also communicate to the instructor system a number of child requests that were generate for a parent request, so that the instructor system may be able to determine how many child keys to re-create and/or how many child requests to identify in a data set from the supervisor system for routing verification.

In another embodiment, an instructor system can send a parent request in conjunction with a sequence of pre-generated instructor keys for use in selecting destination keys. In some instances, this may reduce or eliminate the processing time required by the intermediary system to generate destination keys which may improve processing times and potentially improve results of the executed data processes.

In some embodiments, where anonymity is reduced or not employed, keys may be publicly available or shared with particular third parties such as in the case where third party oversight, oversight by the broker's manager or other manager, or public oversight of request routing is required or desired.

An instructor system 102 may be configured to receive the request data from the supervisor system, decrypt the data and/or correlate the data with parent request data maintained in the instructor system's transaction or request log (e.g., on database). The correlation with data and parent requests may include determining relationships between various child requests and/or between parent requests and child requests.

In some embodiments, the instructor system may be configured to determine whether the child requests sent by the intermediary systems 104 were routed in accordance with one or more routing instructions, or in accordance with conditions for best execution of the order in relation to the prevailing market conditions around the time of the order.

In some embodiments, the instructor system 102 can include one or more devices or processors configured to manage the data processing requests. For example, the processors may, independently of any input from a user of the instructor system, generate/select instructor keys for sending with parent requests, access data from the supervisor system, associate child request data with parent requests based on the instructor keys, and generate verification reports. For example, the instructor system 102 may include a software application or physical device which can perform these functions independently or transparently to a traditional instructor system.

In some embodiments, there may not be a separate supervisor component. Rather, the destination computing systems 108 (such as venues 108a . . . n) may be configured to provide child order data (e.g., market data, order instructions) encrypted using the one or more destination keys. The destination computing systems 108 may then be configured to communicate the information to instructor systems 102. For example, an exchange's computing systems may be configured to publicly publish all transactions (including orders, cancels, replaces, and fills), and also to encrypt the transactions with the corresponding keys received from the broker. Instructor systems may then access the publicly published transactions, decrypt them using the instructor system's set of keys and/or identify all transactions pertaining to the instructor.

Some embodiments may incentivize various participants in performing their respective roles, for example, an instructor may generate keys to verify that an intermediary is performing the specified actions (can be used to verify not only venues but any other order directives). An instructor may, for example, utilize the system on a per order basis and/or include request instructors indicated whether or not, or to what extent to utilize the system 100A supervisor functions.

With respect to intermediaries, the refusal to generate the key sequences and assigning them to requests may be perceived by instructors as an admission of not following instructor directives and could potentially result in the loss of request/order flow. Intermediaries that may be targeted for audits of regulatory violations may potentially utilize the system in helping satisfy regulatory and audit requirements. With respect to destination computing resources, there may be some venues that desire to provide capabilities to their clients to be able to verify that requests that were intended to be routed to the venue by the instructor were routed correctly by the intermediary.

The system may be deployed in various fashions, such as a network proxy based deployment, wherein an instructor side network proxy may be configured select a $BK_0$ and generate acknowledgements (ACKs), and/or a destination/venue side network proxy that may be configured to generate an DK/AI from a keys (e.g., a client key and/or various broker keys) receives and inserts it into the outgoing tag.

The system may be used in conjunction with various systems that may be configured to provide various routing functionality, such as order timing or smart routing algorithms. In some examples, instructors may include instructions for use of such functions in their parent requests.

Although described in the context of validating that child orders were executed in accordance with best execution practices with respect to the client, some embodiments may also provide for validation or verification that terms of execution of the orders favored a party other than, or in addition to, the client. The terms of execution favouring one or more of the parties may include at least one of the opportunities for the respective party to receive a better price than what was currently quoted, the speed of execution, and the likelihood that the trade will be executed.

Figure 2:
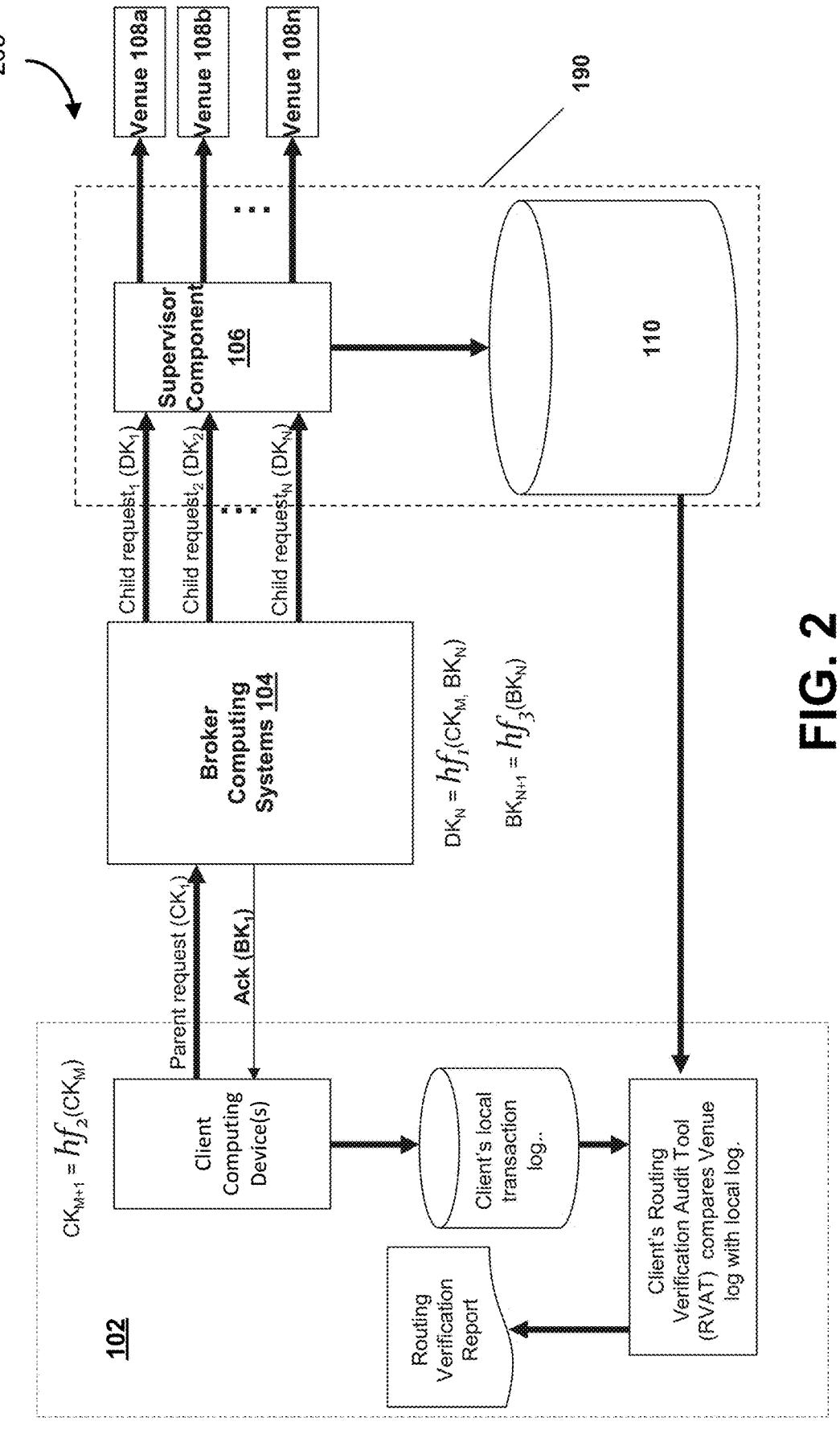
FIG. 2 shows aspects of an example system and workflow for managing data processes in a network of computing resources.

FIG. 2 shows aspects of another example system 200 and dataflow managing data processes in a network of computing resources.

The example architecture in FIG. 2 can potentially provide an additional level of security that may be employed by the intermediary to increase request anonymity at the destination level. In some embodiments, this may account for potentially weak instructor keys being selected by the instructor systems.

The intermediary systems 104 may be configured to assign an intermediary key ($BK_1$) to each parent request and communicate that intermediary key to the instructor systems 102 (for example, along with a communication in acknowledgement of an parent request).

Similar to the selection of keys based on the instructor key as described above and herein, the intermediary systems 104 can be configured to select a sequence of intermediary keys based on an encoding function such as a hash function.

In some embodiments, the intermediary system can select an intermediary key ($BK_1, \ldots, BK_N$) for each child request it generates. Each intermediary key can be merged with the instructor key ($CK_1$) received in conjunction with the parent request using a merge function. The results of the merges become the destination keys ($DK_1, \ldots, DK_N$) for routing with the respective child requests. In some examples, any of the merge functions described herein can be an XOR function, a concatenation, a hash function or any other function for encoding two keys together. In some examples, the merge functions described herein may simply append or mix portions of the two keys together to form a single merged key.

To identify request data from the supervisor server that is associated with a parent request, the instructor/requesting device generates a sequence of the destination keys based on the parent request's instructor key and the intermediary key received from the intermediary system. With this sequence, the instructor/requesting device can attempt to access and/or decode the data from the supervisor server until the child requests accounting for the parent request have been identified.

In other embodiments, instructor keys from a sequence of instructor keys can be merged with intermediary keys from a sequence of intermediary keys to generate destination keys. Conversely, in some embodiments, a single intermediary key can be merged with each of a sequence of instructor keys to generate destination keys.

In some examples, merging two keys as illustrated in the example of FIG. 2 may decreasing vulnerability as multiple keys and/or their generation functions (e.g. $hf_2$ and $hf_3$) must be compromised to recreate destination keys.

Further, the example architecture of FIG. 2 may also prevent the exposure of the sequence of child request belonging to a single instructor request, potentially reducing the exposure of broker algorithms and smart order routing (SOR) techniques to the destination or supervisor systems.

Figure 4:
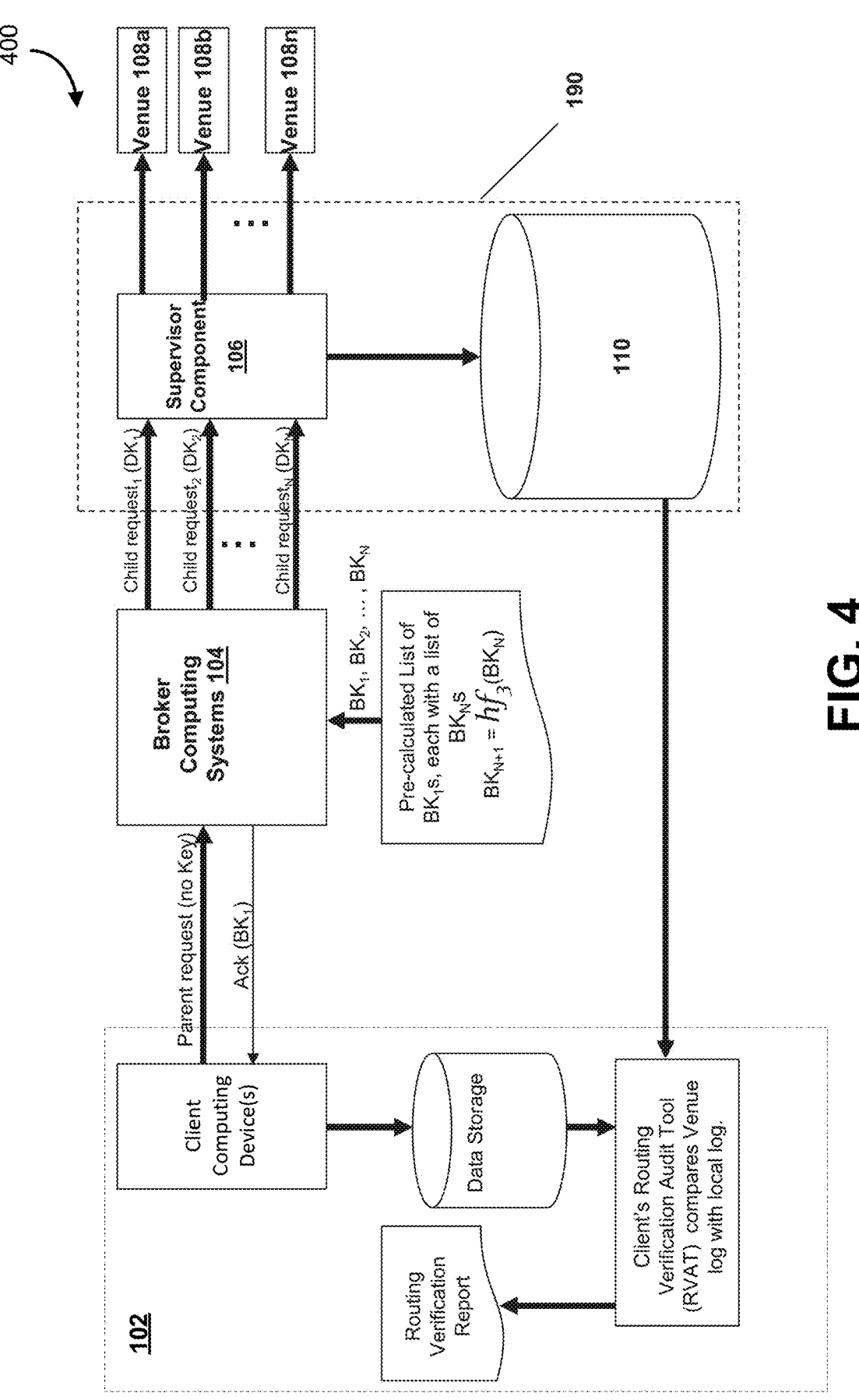
FIG. 4 shows aspects of an example system and workflow for managing data processes in a network of computing resources.

FIG. 4 shows another example system 400 whereby an instructor key is not generated or communicated by the instructor device to the intermediary device. Instead, the intermediary system 104 can generate an instructor key ($BK_1$) and communicate it to the instructor system in an acknowledgement message or otherwise. The process/system will then operate similarly to the system in FIG. 1B, with the instructor system being configured to access and/or decode child request data associated with the parent request using the instructor/destination key ($BK_1$) received from the intermediary system or derivatives thereof (e.g. hashes of the original instructor/destination key to obtain subsequent keys in the sequence).

As the calculation of the child/derivative keys may require significant computational resources, in some embodiments, keys may be pre-calculated. For example, in some embodiments as described herein or otherwise, sequences of keys may be generated and shared between instructor and intermediary systems in advance of any parent request processing.

Similarly, in some embodiments, series of initial instructor keys ($CK_1$) can be communicated between the instructor and intermediary systems at the start or end of a day or otherwise ahead of the actual orders, with which the intermediary system can be configured to pre-calculate series of $CK_{N+1}$ and store them for quick retrieval.

As described in the examples of FIG. 2, in some embodiments, sequences of instructor keys ($CK_{N+1}$) may not be used for generating destination keys. Instead, a single instructor key (CK) can be merged with a series of intermediary keys ($BK_N$) using a merge function such as hash function $hf_1(\ )$ to generate a series of destination keys (e.g., $DK_{N+1}=hf_1(CK, BK_N)$). In these embodiments, since the intermediary keys ($BK_N$) do not rely on the instructor key from the instructor system, the intermediary system can be configured to precalculate sequences of intermediary keys in advance.

Figure 5:
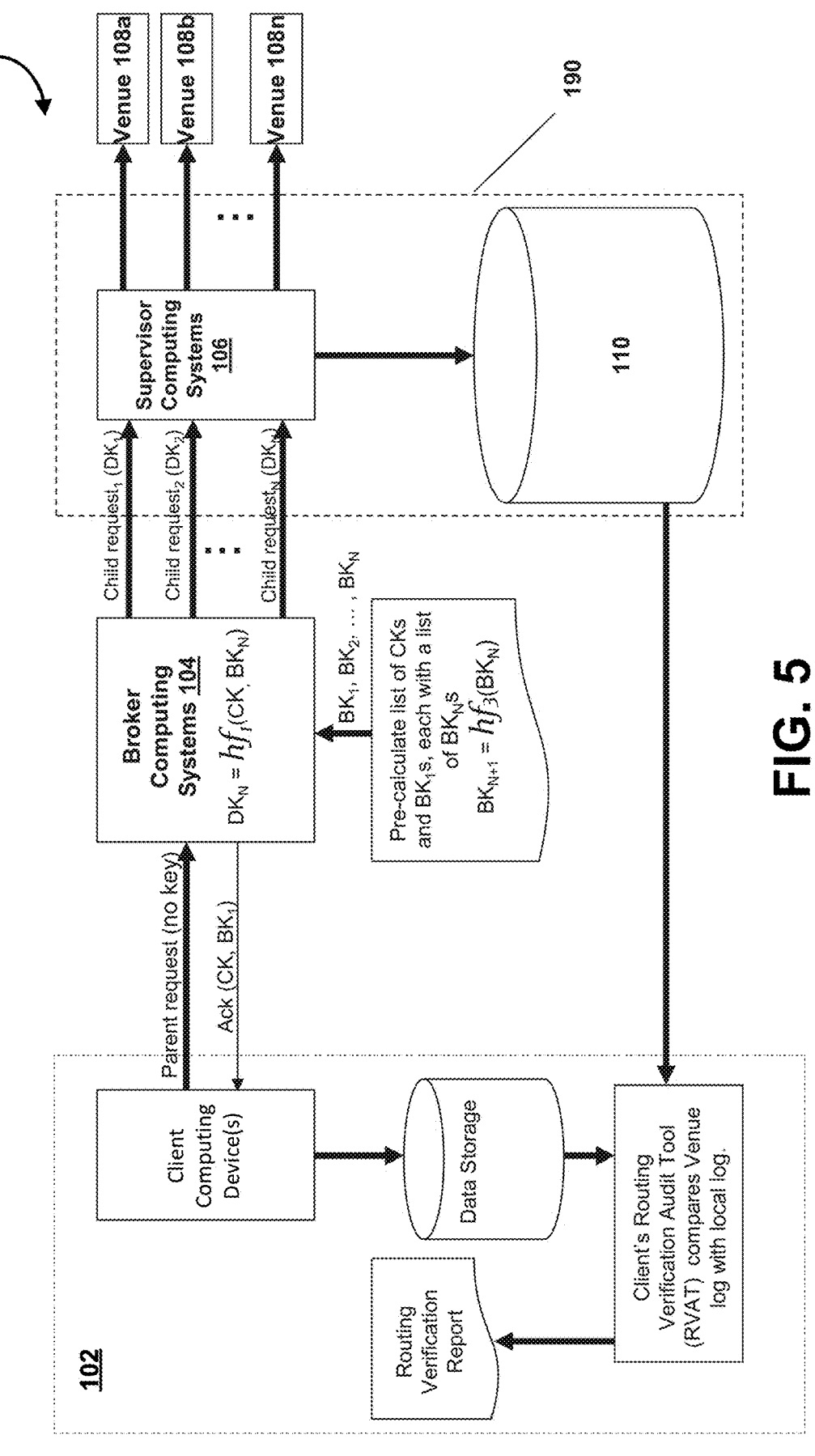
FIG. 5 shows aspects of an example system and workflow for managing data processes in a network of computing resources.

FIG. 5 shows another example system 500 whereby an instructor key is not generated or communicated by the instructor device to the intermediary device. In this example embodiment, similar to the examples of FIG. 4, the instructor system is configured to send a parent request to the intermediary system without a key. The intermediary system is configured to select both an instructor key (CK) and a sequence of intermediary keys ($BK_N$) with which a sequence of destination keys can be generated with a merge function. The instructor key (CK) and at least an initial intermediary key ($BK_1$) are communicated back to the instructor system in an acknowledgement or other message. In some embodiments, this may alleviate the need for an instructor system to be configured or updated to generate any keys. In some embodiments, since both the instructor keys and intermediary keys are generated by the intermediary system, the intermediary system can be configured to pre-calculate sequences of destination keys thereby reducing or eliminating any run-time delays required to generate destination keys.

Figure 6:
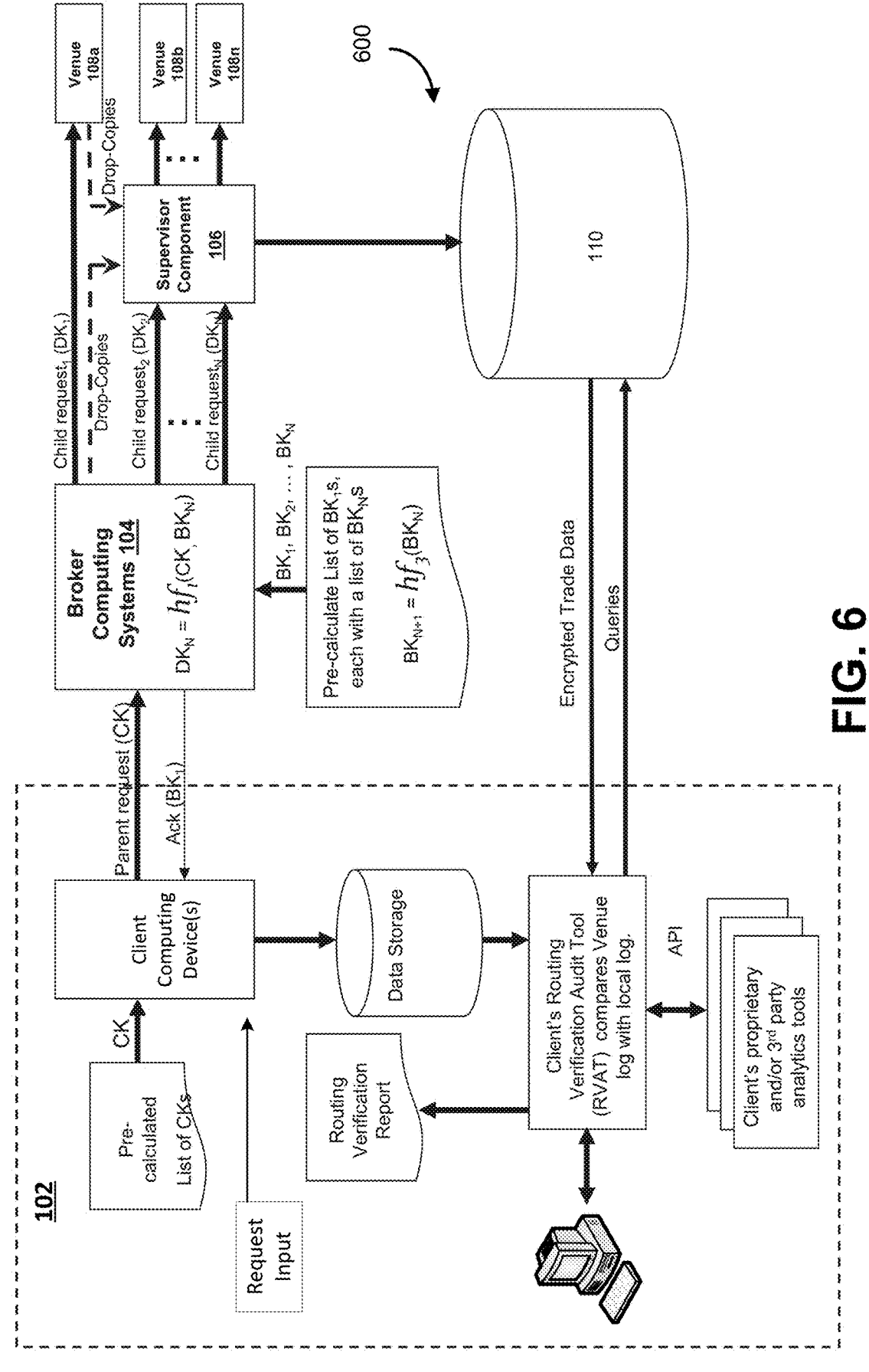
FIG. 6 shows aspects of an example system and workflow for managing data processes in a network of computing resources.

FIG. 6 shows another example system 600 for managing data processes in a network of computing resources. In this example embodiment, not all request order flow from brokers to destination devices will go through the supervisor system, as brokers can choose to bypass supervisor routing and may submit requests directly to exchanges and/or other venues.

For example, intermediary systems can cross requests internally and/or route them to internal dark pools. However, it may be advantageous for instructors to have access to as large a percentage of their request flow as possible through the supervisor system.

In some embodiments, intermediary systems are configured to send drop copies of child requests which may be routed and/or processed internally (such as cross order requests, or internal dark pools) to the supervisor system. In some embodiments, destination devices such as financial trading venues can be optionally configured to send drop copies of received child requests and/or response messages to the child requests. These drop-copies can contain the destination keys sent with the child requests so the mechanism can be processed and stored like child request data received through other mechanisms. As discussed herein, the supervisor computing systems 106 may be configured to store child request data which includes an indicator identifying the source of the data. In some instances, these indicators may allow clients to evaluate the trustworthiness and/or accuracy of the data.

In some embodiments, the use of drop-copies can also be used when destination devices (such as venues or subsequent brokers in a multi-hop environment) are not configured to handle destination keys or other supervisory data.

In some embodiments, drop-copies may be the only mechanism by which the supervisor system 190 can receive request data, for example, when there is no proxy or listening device between the intermediary system 104 and the destination 108 as is the case for example for child request 1 in FIG. 6.

In some examples, the intermediary and/or destination systems may be configured to send drop copies even when there is a supervisor component 106 between the two systems.

Multi-Hop Support

In some embodiments, aspects of the embodiments described herein may be applied to scenarios where there may be more than one intermediary system (e.g. broker) that acts between an instructor system (e.g. client) and a destination system (e.g. venue).

Figure 7:
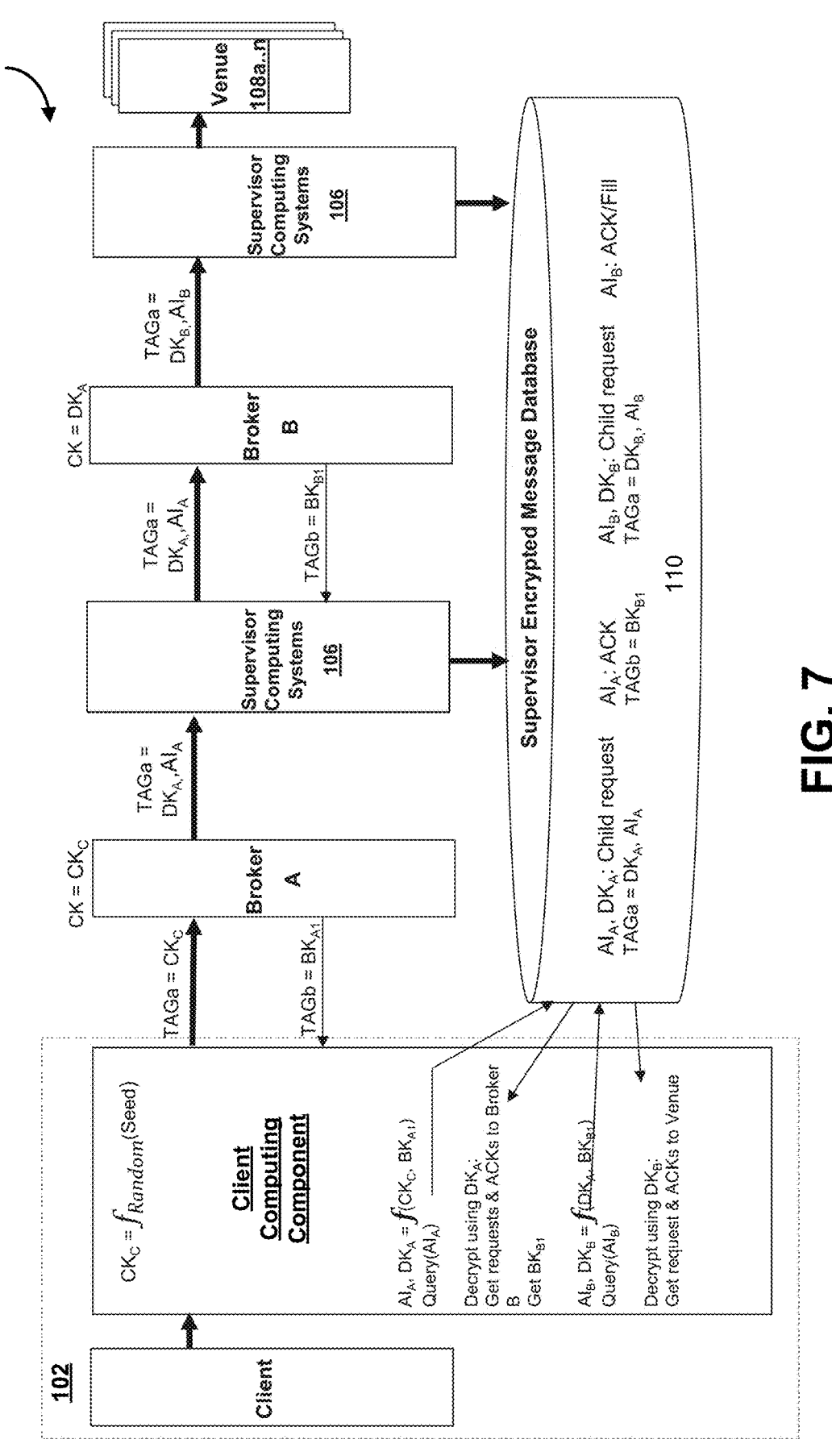
FIG. 7 shows aspects of an example system and workflow for managing data processes in a network of computing resources where more than one intermediary system is utilized between an instructor and a destination.

FIG. 7 is a block schematic diagram showing an example system 700 involving multiple intermediary systems 106 between an original instructing system and final destination computing resources.

In FIG. 7, various keys can be communicated between different systems in conjunction with or in association with different requests. In some examples, the keys can be included as tags or fields including with or transmitted in conjunction with requests. For reference, the TAGS in FIG. 7 have been denoted as downstream (TAGa) and upstream (TAGb); e.g., TAGa includes CK, DK, AI passed forward from an instructor system (e.g. from a client system or preceding broker system in the chain) to an intermediary system (e.g. a next broker); and TAGb includes BK passed backward from a broker (e.g., to an instructor system 102 or component, or to an upstream broker).

Some of these intermediary systems may be configured to operate with the supervisor computing systems 106, and thus may need to be able to provide and/or generate order request identifying information (e.g., in the form of encrypted identification keys) to aid in the downstream tracking and/or analysis of orders related to a client's originating order.

"Multi-Hop" may be a capability of the system, wherein the system facilitates the routing of a request through more than one intermediary system.

Derivative data processing requests may be associated with one another, for example, a request may have a related "child request", a related "grandchild request", a related "grand-grandchild request", etc. Similarly, requests which have been used to derived child requests may be referred to as parent requests, grandparent requests, etc.

In some embodiments, systems in the multi-hop route may be configured to perform the functions of an instructor device, an intermediary device and/or a destination device. For example, the client system can act as an instructor system and generate a parent requests for the Broker A system which act as an intermediary system and routes resulting child requests to Broker B which acts as the destination device. The Broker A system also acts as an instructor system and generates child/instructor requests for the Broker B system which acts as an intermediary system and routes grandchild/child requests to the venues acting as destination devices. As illustrated in FIG. 7, the supervisor system can obtain request data from one or more devices via the routing between these hops in the system 700.

For example Broker A could receive a client order and then route the entire order or a portion of the order through Broker B. In theory, the system may therefore account for an arbitrarily complex order scenario where Broker A routes to multiple brokers and then one or more of them route out to yet another broker, etc. Transactions involving Broker A and Broker B may, for example, be supervised by a supervisor server, which may include supervisor computing system 190 and/or supervisor components 106 as described above or otherwise. Although the structure in FIG. 7 is illustrated as a linear multi-hop structure for simplicity, in other examples, the structure may be tree-like, cyclical, or any other arrangement of system nodes.

In some embodiments, an instructor device may be configured to send a parent request directly to a destination venue computing resource with no intermediary system in between. In some examples, the supervisor system can additionally receive this request data to provide a more complete picture of an instructor system's request activities and/or performance. For example, this may provide a comparison for timing, request fulfillment effectiveness, etc.

The multi-hop aspects may be provided through one or more proxies adapted to facilitate the generation, association with and/or tracking of various cryptographic keys that may be propagated through the routing of the order and/or its constituent parts. The propagation of the cryptographic keys may include the derivation of downstream cryptographic keys, wherein in some embodiments, the derivation of downstream keys includes at least processing one or more upstream keys.

For example, from the perspective of an arbitrary broker in the chain of brokers, an upstream broker may be considered an "instructor device", which then is associated with at least one instructor key and a parent request for execution. The instructor key and the parent request for execution may be received by the broker computing system, and the broker computing system may then generate at least one child request for execution that will be provided to a destination device (which may be a venue, or another downstream broker). This child request for execution may be associated with a "destination key", generated at least based on the "instructor key".

As described herein with respect to other examples, the child request for execution may then be routed to the destination device, and the child request for execution may, in some embodiments, routed such that information associated with the child request can be obtained by the supervisor server, which then stores and/or makes available the execution information (e.g., acknowledgements, sent orders, confirmations, timestamps, identifier for the supervisor collection mechanism, etc.) for future analysis.

Accordingly, there may be more than one broker in an order processing chain, where a Broker A might route orders through a second Broker B. There may be any number of brokers, or "hops", in such a chain. The supervisor computing systems 106 may be utilized, in some embodiments to monitor these activities arising out of the client's initial order to Broker A. If Broker B is not enabled for operation with the supervisor computing systems 106, the architecture can be configured to operate as though Broker B is the venue, and Broker A's activities can be monitored as described in some other embodiments.

However, if Broker B is enabled for operation with supervisor computing systems 106, then Broker B's order filling actions should be related to Broker A's order filling actions in supervisor computing systems 106. Such a solution should be able to function given that each broker does not necessarily know where it is in the chain of brokers, and the chain of brokers may be a tree of brokers, not a linear chain. Further, there may be importance associated with maintaining broker confidentiality (e.g., avoiding a downstream broker from being able to decipher the routing algorithm of an upstream broker). Configuring the supervisor computing systems 106 to be able to support such a scenario may increase complexity in some implementations, but also provides an opportunity to develop a robust solution that provides order routing verification while maintaining confidentiality between brokers and/or the general public.

To provide further detail in some embodiments, the client and Broker A communicate using a client key (CK). Broker A may send orders to Broker B using a destination key A ($DK_A$). Broker B may send orders to broker C using a destination key B ($DK_B$), etc. Gateway proxies or listening devices may be provided to monitor communication between each broker pair, saving information to supervisor computing systems 106. The proxy may implemented in hardware or software (or a combination thereof) and may be physically present at the output of one broker, or at the input of another broker, or both, or may be remotely located from both (e.g., across a network). The same CK could be used between each hop, but this may not as effective for obscuring the client's trading activities.

When Broker A and Broker B are enabled for use with the supervisor computing system 106, any supervisor computing system 106 specific data may be communicated between the brokers in a metadata tag specific to each individual order sent from Broker A to Broker B.

Referring to FIG. 7, Broker A may send an order to Broker B through supervisor computing systems 106. Broker A copies DK into TAGa (the same tag used by clients to send CK)—this indicates to supervisor computing systems 106 that this is multi-hop message and it allows Broker B to treat it like it's a message from a client. Broker B may transmit an ACK of the message with an intermediary key BK.

Accordingly, the instructor system 102 may be able to receive BKa from Broker A, calculate $AI_A$ and $DK_A$, query supervisor data storage with $AI_A$, decrypt the orders and responses between Broker A and B, extract from the ACK message from Broker B to Broker A the $BK_B$ key, and/or calculate $AI_B$ and $DK_B$.

Where a client wishes to identify orders routed based on the client's instructions, the client's computing systems 102 may be able to utilize the client computing component to query data storage associated with the supervisor computing systems 106 with $AI_B$ and decrypt the orders and responses between Broker B and the venue(s) 108a . . . 108n.

In this example, initially, Broker A receives an order from a client and receives a tag called $TAG_A$ from the client, including the client's CK, which itself may be generated by supervisor computing system 106.

Broker A places an order with Broker B to fill the client's order request. In so doing, Broker A sends back a tag called $TAG_B$ to the Client which contains a broker key for Broker A ($BK_{A1}$). Broker A also generates $DK_A$ and $AI_A$ (anonymous index) based on CK and $BK_{A1}$, and includes $DK_A$ and $AI_A$ in its own new $TAG_A$.

Broker A's $TAG_A$ is then sent with the order to Broker B. Supervisor computing system 106 records the order and $TAG_A$ in its database. Broker B receives the order, and repeats the process, using the received $DK_A$ as though it were the CK.

Broker B then generates $DK_B$ and $AI_B$ based on $DK_A$ and its own broker key $BK_{B1}$. Broker B sends back $TAG_B$ containing $BK_{B1}$, which is stored in the supervisor computing system 106 database as an acknowledgment that the order was received or filled, and the process continues until the ultimate venue is reached.

As each subsequent DK is related to the DK or CK that immediately preceded it, the client may be able to query the supervisor computing system 106's database to find each related order message.

If a BK is determined to be associated with the AI message stored in the database, the client's computer would be configured to determine the next DK and query the database for the next order message using the known DK and the associated BK retrieved from the database.

Broker A's key, received in the first $TAG_B$ from Broker A may be used to query the supervisor computing system 106's database for Broker A's AIs. In response, the client may receive all messages and acknowledgments in the database stemming from Broker A. Either the client's computer, a supervisor computing system 106 proxy that it interfaces with, or the supervisor computing system 106's database may perform one or more processing steps (e.g., extraction, transformation, loading, calculating, determining) to identify which of all of the messages and acknowledgments are associated with the client's initial order.

As there may be multiple hops of brokers, in a linear chain, cycle or branching tree arrangement, to fulfill a single client order, the supervisor computing system 106 may be configured for following each branch of broker activity in the supervisor computing system 106's database to recreate all broker activities for a particular client order.

The system may therefore follow a broker chain of activity in the database until the chain terminates in a destination computing resource such as a venue (e.g., an order request processing facility, a stock exchange, a dark pool, an order matching system). This could occur where there is no DK present with an AI stored in the database. For order filling activities between brokers, the acknowledgment response from a broker filling an order may include the broker's key BK.

Venues may not necessarily have any order verification capabilities, and may not respond to the immediately preceding broker with any acknowledgment containing a further key. In these scenarios, the supervisor computing system 106's database would have only stored the AI from the broker immediately preceding the venue with no associated AI. A proxy may be configured to interpret that situation as the endpoint for that particular order.

As each broker may send parts of a client's order to more than one other brokers for filling, but this has not necessarily been communicated to the client, the proxy may be configured to track and/or monitor (e.g., look for) multiple child orders using the same initial CK and BK and thereafter the same DK and BK. There may be multiple entries in the supervisor computing system 106 database indexed by the same DK/AI combination. Each such entry may be retrieved and analyzed by the proxy.

In some cases, there may be gaps in order messages stored in the supervisor computing system 106's database. The proxy should not necessarily terminate looking for order messages if one AI cannot be found in the database, especially in cases where the AI and/or DK for subsequent order messages may be known or deducible by the proxy. For example, each broker may be configured to communicate AIs, BKs, DKs, or any combination thereof back to the preceding broker or client in the chain, possibly ultimately forwarding all the way back to the client.

The client may then be able to query the supervisor computing system 106's database for all order messages that should have been generated and stored in the database. If one particular order message cannot be found, the client may still query for all other expected order messages.

Examples of possible end cases for querying the database for order messages may include:
(1) order completed in entirety (found fill messages for each order)
  a. if don't the order does not get entirely filled (e.g., does not get 100% fill):
    i. broker allows client to recreate broker keys with hash
    ii. query database until you cease to see a key
      1. broker may have skipped a key
    iii. broker may send client a terminal key boundary to stop looking
(2) order time period has expired;
(3) order has been cancelled; and
(4) client loses connectivity with broker.
Terminal messages may be stored in the database or be provided back (e.g., sent/transmitted) to the client. Generally, the client (or the proxy) may continue to hash broker keys searching for (e.g., looking for) order messages in the database using the hashed keys until a gap is found in the database. The client/the proxy may process another number of (e.g., 20-30) broker keys to see if anything else is there, and then stop if there continues to be nothing found.

If the broker sends all broker keys used to the client, instead of letting the client re-create them, then the client will only see what the broker wants the client to see. Other activities by the broker may still be stored in the database, but may not be locatable by the client. When the client is configured to generate, or re-create, broker keys, the architecture provides greater opportunities for the client to check up on the broker's activities through the use of the various keys.

For example, Broker A could eliminate an order route from the client's view (e.g., a route that provided a profit to Broker A) if Broker A only sends the broker keys and doesn't let client regenerate all keys that would have been used.

If each DK was not somehow related to the previous DK, or to the original CK, then the client would require another way to retrieve all broker activity from the database for a given order. That could be possible if only a single CK was used in place of all of the DKs, but then multiple stages of the same order fulfilment would be more readily identifiable by third parties reviewing the supervisor computing system 106's database.

In some embodiments, each broker could communicate its respective DK back to the previous broker in the chain, and ultimately back to the client, so that each DK would not necessarily have to be derivable from the original CK in this case. However, the client/the supervisor computing system 106 would then have to maintain a larger record of DKs for each order, and may have greater difficulty discerning the order of hops in the chain of brokers without additional data.

The key and/or encoding/encryption techniques may also be adapted for ease of traversal and downstream identification (e.g., by the supervisor and/or client computing component(s) thereof). For example, keys and/or encoding/encryption techniques may be adapted such that it may be easier to quickly identify information that may be associated with, for example, a particular order. A set of techniques described herein include the use of "anonymous index" techniques, but other techniques may also be contemplated.

In some single-hop and multi-hop configurations, an anonymous index (AI) may be used to index and locate order messages in the supervisor computing system 106's database may be related to the keys used. For example, an AI can be a truncation or a hash of a DK. Other relationships between the keys and an AI.

When DKs and AIs are combined in a tag, a tag length may be set to a particular length for obfuscation. For example, if a key used is shorter than the field length, it may be padded in front.

In some embodiments, in the resulting tag, the AI may be the right-most part, and the DK may be the left most part. There may be overlap between these two portions of the tag. In this way, it may be possible to support increased bit lengths for keys while still supporting shorter legacy keys.

In some examples, the supervisor server/system can encode request data with a DK and store it in conjunction with a corresponding AI.

In some embodiments, an index such as the AI may then be used by the client to locate request data stored at the supervisor server. For example, the client may reconstruct the AI for each child order relating to the original client order using the instructor and/or broker key(s). The client may then query the supervisor server with each reconstructed AI to retrieve the child order data corresponding to the respective AI.

In some examples, the use of indexes to store data at the supervisor system can reduce computation required by an instructor or other requesting device to identify request data associated with its keys. For example, for a supervisor system which collects request data for numerous brokers, clients, and/or venues and handles millions of requests a day, attempting to decode all request data to identify an instructor's requests is computationally intensive. Instructor or other requesting systems can request only the encoded request data corresponding to their re-generated AIs, thereby reduced the set of data that the systems must attempt to decode. While there may be AI collisions between different DKs, since the full DK is required to decode the data, only an instructor device having the full DK will have access to the underlying data.

In some embodiments, the proxy/requesting/instructor device may be configured to request data corresponding to its actual AIs as well as random or decoy AIs. In some examples, the addition of decoy AIs can obfuscate the true number of AIs and/or requests of the client from eavesdropping third parties.

While the above example is described with respect to the relationship between DK and AI, in other examples, the supervisor system can store request data in conjunction with instructor keys (CK), intermediary keys (BK), destination keys (DK), an instructor identifier, or any combination or derivative thereof.

In some implementations, any single DK used by supervisor computing system 106 may be of arbitrary length, and may be padded to hide the true length of the key or to conform to a predetermined key length. The maximum key length may be increased at any time, and previous legacy keys may be padded if necessary. Key lengths may be defined based on day/time periods. The database would be configured to remember what length keys were used at what times. It may be advantageous that the key tag length exceeds the size of the actual DK and AI content stored therein in order to provide further obfuscation of order messages.

In some embodiments, an intermediary system 104 can be configured to truncated, mask, hash, or otherwise encode a destination key before it is routed with a child request. For example, a 512-bit $DK_N$ generated from an XOR of an instructor key CK and an intermediary key $BK_N$ may be truncated to 256 bits for use as a destination key. This truncated or otherwise encoded DK can be used to encode and/or be stored with the child request data at the supervisor system. By encoding the DK, a supervisor, destination and/or third party having knowledge of a hash or other BK or DK function hf will not be able to recreate other keys in the sequence because the DK transmitted to the supervisor/destination has been truncated or encoded such that applying the function hf will not provide the next key in the sequence. In some examples, this may provide another level of data protection.

Each user of supervisor computing system 106 may not be granted access to the entire supervisor computing system 106 database for querying. For example, a user may have to be provisioned to access different instrument types, regions (by region codes, e.g. North America, Europe, Asia, etc.). Each entry in the supervisor computing system 106 database may therefore be associated with a date, region code, instrument type, and AI. Due to padding tags, or other reasons, sometimes AIs may be duplicated between orders.

In that case, the client's system may attempt to decode each encrypted message having an AI that the client believes belongs to the client. If the client's system is unable to decrypt the message for a particular entry, the client's system will assume that that message is not the client's message, and will move on. Supervisor computing system 106 may replicate data from data centres worldwide so that users will be able to access worldwide data originating from other data centres locally, if the user has access privileges to do so.

While various keys are discussed above, these keys are primarily used for indexing. Supervisor computing system 106 may not require that order messages themselves be encrypted, and in many cases the orders are not encrypted, which is intended. However, in some cases, it may be necessary or desirable that the contents of particular order messages between brokers, and stored in the supervisor computing system 106 database, be encrypted. The means to decrypt the contents of such encrypted messages may preferably not be known to the supervisor computing system 106 database or to third parties. Any encryption of message contents may be entirely independent from the CK/BK/DK/AI system used by supervisor computing system 106. In this case, each broker would need to be able to encrypt in a manner that the subsequent broker, and also the client, could decrypt.

Both Broker A and Broker B may therefore need to store any keys necessary to decrypt messages from preceding brokers and encrypt subsequent messages, and the client would also need the decryption key(s). Broker B may be communicate an encryption or decryption key in advance from the first broker in the chain, or the preceding broker. Any such communication of keys may be sent forward by a preceding broker over a separate communication channel than those for communications monitored by supervisor computing system 106, thereby hopping supervisor computing system 106 entirely. Each broker may use the same key for a particular order, or each broker may have a unique key for each order, requiring the client to receive and store decoding (e.g., decryption) keys for each hop in the chain.

In some embodiments, the same broker could appear multiple times in the same chain. In such a scenario, the same broker may use the same and/or different DKs.

In some embodiments, the broker may send out an DK in a tag to the next broker and to supervisor computing system 106, the existence of the DK in the tag may be used as a flag to the client that this order is going to another broker in a chain.

In some embodiments, a proxy may or may not be configured to process each retrieved order message as though it refers to a subsequent hop in the order processing chain, so the message tag may be used as a flag to the client that the chaining algorithm of message retrieval is to be applied.

In some embodiments, the acknowledgment message (ACK) from a downstream to an upstream broker may include its BK, stored by the supervisor computing system 106's database so the chain may be followed. The ACK may, for example, return a key used in multihop scheme (e.g., Broker B returns its BK towards Broker A in an ACK, filtered by the proxy so that the BK gets stored in supervisor computing system 106's database, but doesn't make its way back to Broker A.

For example, the supervisor computing system 106 may query $BK_{A1}$ CK to obtain: $DK_A$ $AI_A$, and lookup $AI_A$ to get $BK_{B1}$.

As another example, the supervisor computing system 106 may query $BK_{B1}$ $DK_1$ to obtain $DK_B$ $AI_B$.

In some embodiments, supervisor computing system 106 may be configured to store acknowledgments in supervisor computing system 106's database in addition to the order filling request messages from brokers. For example, a broker's computing systems 104 could send a message to supervisor computing system 106 and provide a copy directly to venue (e.g., through a drop copy).

Multi-Leg Support within a System

In some cases, a broker may have multiple internal systems through which orders are processed. Similar to the examples where a supervisor system and the communication of keys between systems provides for the management and monitoring of networked computing resources, these aspects can be similarly applied to monitor child request handling within a system such as a single intermediary/broker system.

Figure 8:
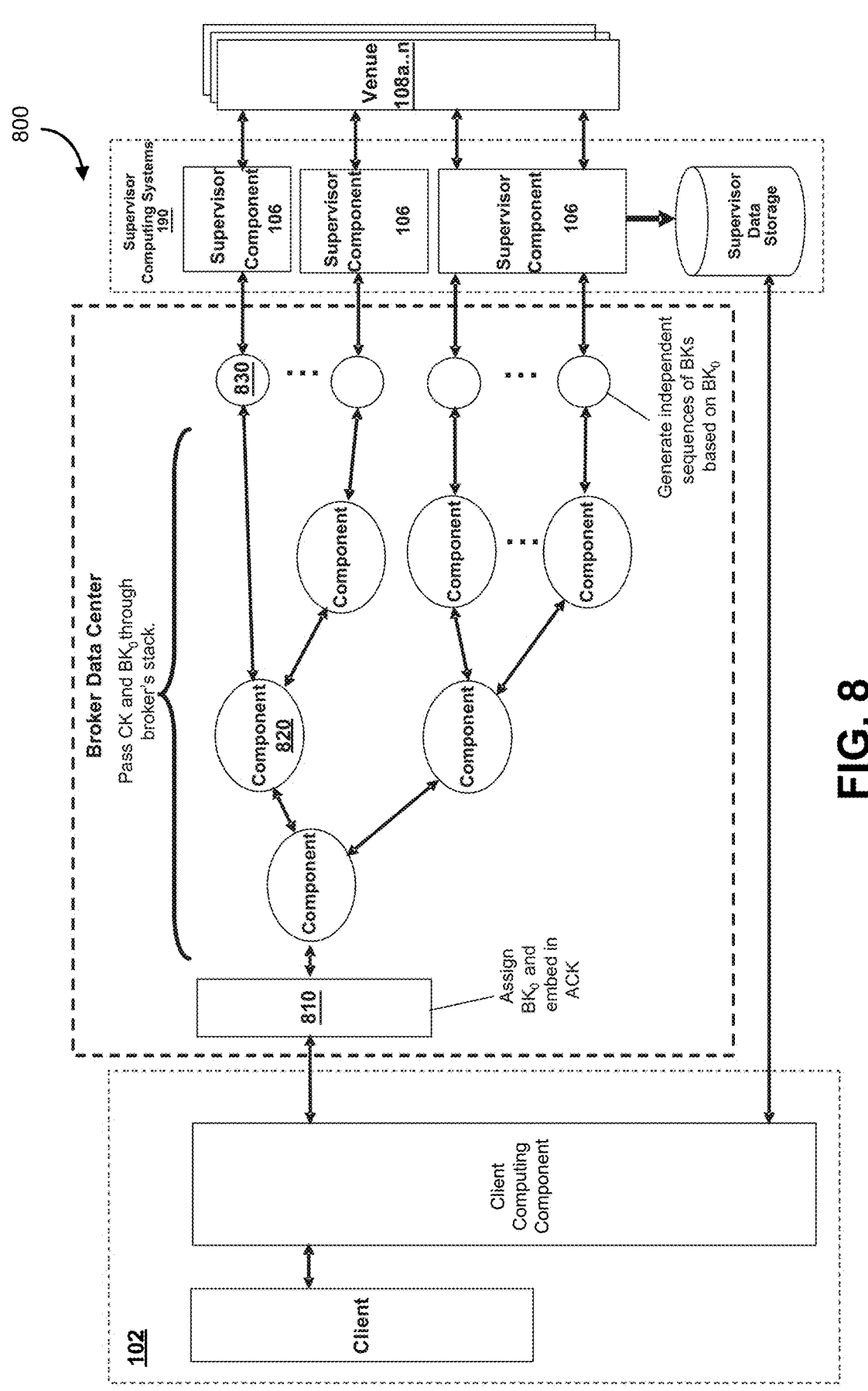
FIG. 8 shows aspects of an example system and workflow for managing data processes in a network of computing resources where a system has multiple internal systems upon which orders may be processed.

FIG. 8 is a block schematic diagram illustrating an example implementation where a single system such as an intermediary device has multiple internal systems 810, 820, 830 upon which requests may be processed, according to some embodiments.

Where a broker has an internal chain structure, where each computer sends data directly to the next computer for ultimately filling orders, the situation may be simpler and may not require specific steps to be taken.

In a base implementation, $BK_0$ would be generated by the broker electronic trading entity 810 that generates a child order (e.g., the smart order router) and then communicated back to the client in the ACK to the client order. Then, the sequence of BKs generated by the broker entity would be a simple single list that could also be reproduced by a supervisor system. However different intermediary system structures may complicate this process.

In some examples, the processing components 820 that generate the child requests may not be processing component that sends the ACK for the parent request. The sending of the ACK may be done upstream in a client facing gateway, and accordingly this could require that there be some sort of BK selection synchronization between the upstream system and the downstream processing component that generates child requests.

Processing components 810, 820, 830 can include smart routers or other computational and/or networking devices for processing and/or generating child requests for routing. In examples where there is more than one processing component/computing device which generate child orders potentially concurrently, mechanisms are implemented to avoid collisions between the processing devices 810, 820, 830.

In some examples, there may be multiple processing components 820 that generate child orders that are running independently. For example a 10K share client order may be split so that one processing component running algorithm A trades 3K shares and the remaining 7K shares are traded by another processing component running algorithm B. Another deployment approach may be to manage the BK selection and DK/AI insertion in the gateways. Since there may be many gateways, coordination of BKs can be impractical.

The "Multi-Leg" system 800 provides an ability to handle a single parent order being handled or processed by multiple processing components generating or handling child requests within a system. This is an issue for the architecture because ideally, each entity should be able to assign the next $BK_N$ in sequence starting from the initial $BK_0$. However, if the entities are only loosely coupled, such as where there are two or more algorithmic routers or smart order routers, or two or more gateways, etc., coordination may be challenging and may incur unwanted additional latency.

Large strings of BKs can be generated by simply running encoding or hash algorithms (e.g. SHA512) in a loop as many times as necessary. However this may be computationally expensive and does not scale if there are many "multi-leg" processing components.

In accordance with some embodiments, an approach to reduce the computational cost of generating BKs while at the same time reducing the computational time to a small constant for generating an arbitrary BK (as opposed to requiring generating a string of BKs) is to generate a multi-dimensional array of BKs where each entry is an XOR of the BKs along the axis of the multi-dimensional array. In some embodiments, selecting the divisor number and the BK block dimension size to be relative primes can improve that likelihood that the BKs generated will not overlap until all BKs in the array have been used. Even where an overlap occurs, in some embodiments, further approaches, such as rotating the BKs along one of the block dimensions by one 1 byte every time the block wrapped around can help generate over 1 million unique arrays from the same set of precalculated BKs. Since calculating a BK entry requires constant computation time irrespective of the BK index, the divisor for the scheme can be arbitrarily large (larger than the maximum number of indices that may ever be required).

In some embodiments, the system may be configured to support the multi-leg approach by assigning an initial $BK_0$ to a parent order, and then allowing all entities that generate child orders to do so independently by assigning them a unique modulo index "i" and a divisor "m" where "m" is equal to or larger than the largest "i" in the pool of entities. Other numbering methodologies are also possible. An entity generates child requests and assigns BKs to them by starting with BK indexed by "i" and then incrementing by "m". So the first BK sent would be "i", the second "i+m", the third "i+2m", and so on.

For example, a processing component indexed as "3" in a pool of entities with divisor "7" would send out the following sequence of BKs: 13, 10, 17, 24, 31.

In this example, a proxy/a supervisor computing system may receive BK index 0, and then be able to calculate all subsequent BKs in the series reproducing the same BKs that would be used by the broker entities.

Accordingly, the system may not be able to determine the index of the entities that generated child orders and would have to employ a heuristic algorithm to find them.

In some embodiments, if the broker chooses not to implement a Multi-Leg strategy, then it can uses a default entity ID/modulo index (e.g. 1) for all child orders.

Where a broker has multiple order-filling components/computers (order routers) that each can fill part of an instructor client's request, then there may be an increased challenge for supervisor computing system 106 to track the broker's activities. The instructor may wish to track all of the order fills performed by different parts of the broker, while maintaining good level of anonymity, and maintaining reasonable execution times.

For example, the client connects to a broker, through a supervisor computing system 106's proxy, the broker sends orders to one or more algorithmic routers for filling orders. A proxy server might reside between each router and the path outside the broker's internal network. A challenge may ensue regarding how to generate and allocate broker keys to each order filling action by each router.

Supervisor computing system 106 might reveal how long it takes a client's order to get processed through the broker. The same order could be handled by one or more routers, or might be handled by different routers at different times, throughout a day or other time period. One or more of the broker's routers using the same keys may be sufficient in ensuring that the architecture will function, but to better obfuscate activities between brokers, it may be an improvement that each fill by each router is configured to utilize a different BK, which also has to be verifiable by the client (e.g., so that the client is able to, by processing the records, determine, through using the BKs, which orders and/or processing requests were related to the client's orders—so that the client is able to validate and/or analyze the broker's performance).

In an embodiment, a first example method to track a broker that uses multiple internal order routers may be for each router (or leaf in the tree) to use the same broker key (BK) for a particular client's order. In that case, the BK should be communicated to each leaf. This may be accomplished by sending the actual BKs to each router, or by sending an index to an internal database of BKs, for each router to then lookup the BK to be used for each order.

Filling orders in this way may result in multiple entries in the supervisor computing system 106's database having the same index, necessitating a method described above for a proxy to retrieve all order messages that are indexed by the same AI (e.g., the client shouldn't stop identifying potential matches as soon as one message with that index is found).

While in some embodiments, the system does allow for querying of multiple order messages with the same AI, this method may expose that the broker is splitting an order X number of ways. A third party could count how many duplicate AIs exist and extrapolate some information about order filling activities based on that information.

Accordingly, in another embodiment, an alternate method is applied. In this embodiment, each order router could generate or be assigned its own BK. This BK would be communicated back to the client. The broker's computing system 104 would be suitably configured to send all leaf keys back to the client. BKs could be transmitted to the client one at a time or in batches as the order is being filled. The BKs could be communicated only when the order begins being filled, or when the order is entirely filled.

In such an embodiment, a challenge to be overcome may include managing computing performance in relation to the generation of the BKs. The generation may become computationally complex, which may lead to downstream and/or overall performance issues. Accordingly, in some embodiments, in order to improve performance of the generation of BKs, and to allow the client to recreate the BKs, instead of having to receive them individually, BKs may be allocated to each internal order router if the number of order routers is known.

While various methodologies may be utilized, one such methodology is to allocate BKs is using modulo division. For example, assuming that the broker uses 25 internal order orders, BKs may be allocated starting from the number 1, by modulo division 25, meaning that the following BKs would be allocated to the first order router: 1, 26, 51, 76, etc., and the following BKs to the second order router: 2, 27, 52, 77, etc., and so on.

For example, modulo division 10 would instead assign 1, 11, 21, 31, 41, etc. to the first order router. In this case, each router could send back the index number for the final BK used to fill that client's order.

The indexes could be communicated to the client to recreate the BKs, which may be more efficient than communicating the entirety of every BK used to the client. Each branch in the tree of order routers could communicate its terminal BK index value back to the client continuously, but it may be preferable to collect the terminals values of all routers and send back as single acknowledgement to client.

The client will then have to query the database for all AIs using all of the BKs. When the client examines the database for AIs, a missing AI in this case may not necessarily mean that there is an anomaly to be concerned about. For example, BKs 1, 11, 21, and 31 may be used by the first order router, while only BKs 2, and 12 may be used by the second router, leaving possibly many BKs in-between 1 and 31 unused.

However, modulo division may be wasteful if one or more routers don't use many of their keys. In the modulo method, each router (or supervisor computing system 106 proxy connected to each router) may have a unique ID.

BKs may be pre-calculated in a pool for each proxy/router to pull from or the keys could be passed through internally. Where there are a large number of routers, this may become inefficient. A possible solution would be to not generate the BKs until needed. After one round of BK generation, a router/proxy to query supervisor computing system 106 to see what BKs were used, then generate the next key for those used BKs (e.g. if BK01 used, generate BK11, but if BK01 not used, don't generate BK11).

Ideally, one may desire infinite BKs, selected arbitrarily. If BKs are generated by XOR'ing one set of BKs with another, then a smaller number of BKs need to be pre-calculated. For example, pre-calculate BK01 to 20, and XOR those with BK21 to n as needed. Each row of the resulting matrix is then determinable by any of the routers/proxies. Furthermore, either axis of the matrix can be shifted or BKs can be bit-shifted and recalculated once matrix is exhausted.

Each smart router may be configured to perform matrixed key generation according to this algorithm. A proxy (e.g., the client) could also reproduce the key by knowing the parameters of the matrix. In some embodiments, the divisor (e.g., for modulo operations) number (number of routers) should be a relative prime of the matrix. For example, in a 5×5 matrix, a divisor of 3 and a divisor of 7 may lead to overlapping results.

A proxy could be designed into each smart order router instead of being a separate device.

In some embodiments, an alternate approach is utilized instead of the modulo approach for generating sequences of BKs. An entity-specific BK is generated.

For example, under this approach, each entity starts with $BK_0$ and then generates an entity specific $BK_{E0} = fSHA512$($BK_0$, Entity_ID). The Entity ID may need to be anticipated by upstream clients and brokers (e.g., in some embodiments, it is set as a simple integer starting with 1). The sequence of entity specific BKs can be generated using cascaded encoding, for example: $BK_{En+1} = fSHA512(BK_{En})$.

An advantage of this approach is that it guarantees that overlap of DKs and AIs among different entities is unlikely. The approach also uses sequential strings of BKs with a unique block of BKs for each entity, rather than a modulo scheme with all BKs sharing the same block of BKs. The approach does not require that entities share precalculated BK blocks. Each entity generates and maintains its own BK block that it may precalculate further BKs; however, a list of BK0s may need to be shared to facilitate precalculation.

The entity that assigns $BK_0$ to a CK may need to be able to communicate that selection to involved parties. For example, A $BK_0$ may need to be sent back to the client in the ACK message; $BK_0$ may need to be communicated forward to all entities that are generating child orders—this can be communicated as the index of the $BK_0$ in the shared list of BK0s or it can be communicated as the actual $BK_0$.

When a downstream entity receives a $BK_0$ it can either generate a BK block directly from it in real time (the block can be generated incrementally or in its entirety) or it can look up the $BK_0$ in its pre-calculated $BK_0$ blocks based on a previous shared list of $BK_0$s.

Internal Monitoring by Broker of Broker's Own Systems Using an Internal Supervisor System Instead of the client using supervisor computing system 106 to monitor and verify the Broker's activities, which may still take places, independently of that, the broker may be monitoring its own internal routers using an internal database and proxy-like application. The broker may then be able to monitor smart order router activity and possibly detect anomalies, such as a router filling orders in an unexpected or unintended manner.

For example, such a solution may be provided in the form of a broker deployment toolkit including entity management and configuration.

Figure 9:
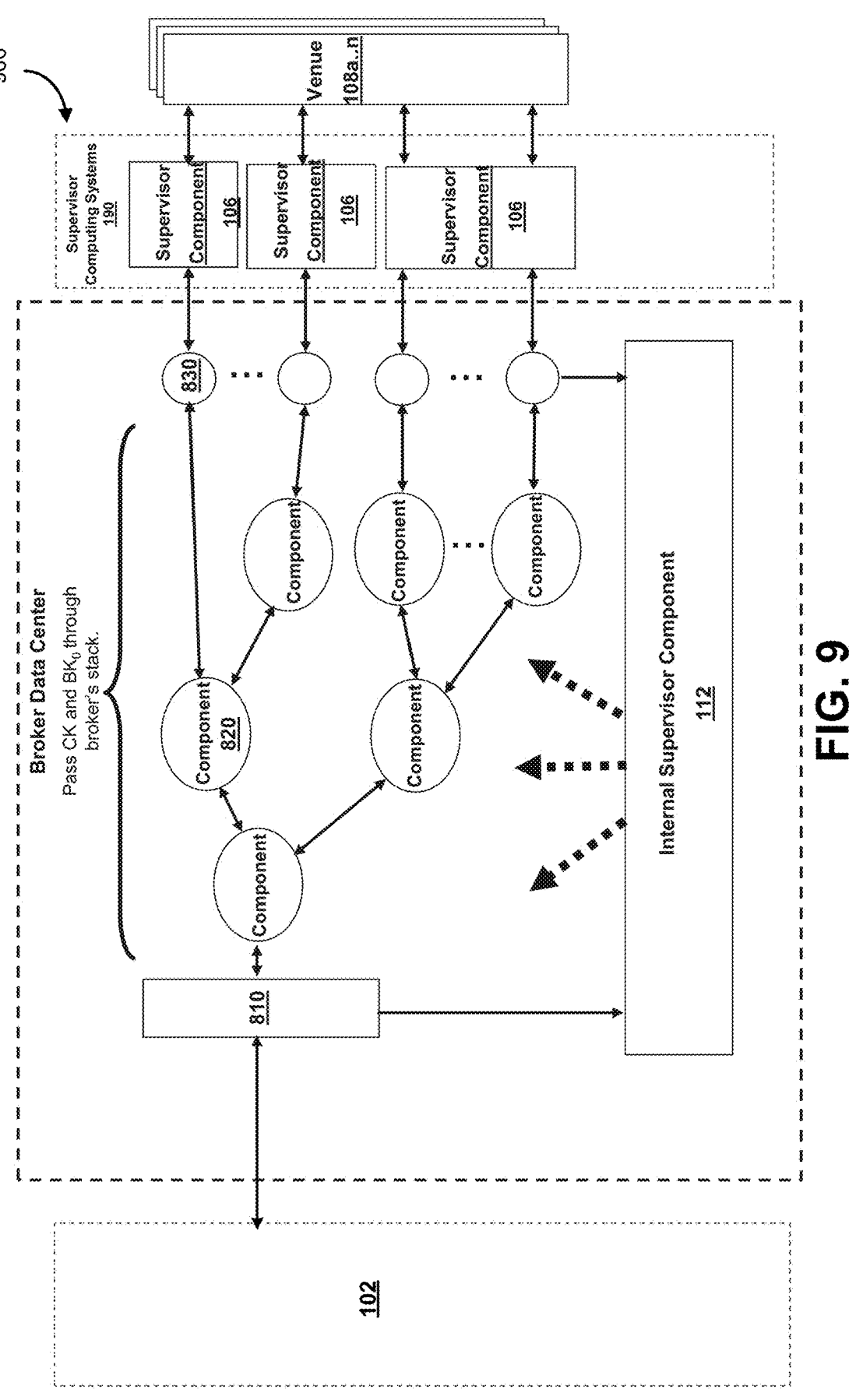
FIG. 9 shows aspects of an example system and workflow for managing data processes in a network of computing resources where a system has multiple internal systems upon which orders may be processed.

FIG. 9 is a block schematic diagram illustrating aspects of an example system 900 implementation where a single broker has multiple internal systems upon which orders may be processed, and the broker utilizes a broker-side internal supervisor application/component to monitor the broker's own performance, according to some embodiments.

The internal monitoring system may, for example, perform various analyses in relation to performance and/or usage, such as latencies associated with latency levelling techniques, options management, etc. The solution may aid in, for example, ring-fencing risk checking capability, and utilize key strategies (e.g., CK/BK strategy) to correlate incoming client orders with outgoing child orders.

There may be an internal supervisor computing device or application 112 that may be utilized for various purposes, such as to check if outgoing quantities ever exceed incoming quantities, check if outgoing order parameters (price, side, quantity, TIF, . . . ) are not consistent with incoming orders or with configured parameters or options, check for lack of outbound activity, check for ineffective outbound activity—large numbers of child orders that are not generating fills, generate real time electronic alerts, provide a manual or automated kill-switch capability, generate electronic alerts with multiple levels of trigger, and/or to provide a GUI display of detected anomalies.

The internal supervisor computing device or application 112 may be configured to coordinate with a supervisor computing system 106, and the supervisor computing system 106 may be positioned at the input to broker system and the outputs of broker system's smart order routers.

Each proxy may communicate to an internal server similarly to how the supervisor computing system 106 receives data from in-between broker-broker and broker-venue. The internal supervisor computing system server may be private, or may also route to an external supervisor computing system 106 server—routing externally may be useful where the broker is itself a client of another broker.

In some embodiments, as this system is internal, encryption may not be as important, and may not be used. Only data internal to the broker is stored and accessible.

A problem to solve is that sometimes a smart order router is not operating properly, or is programmed in a manner that results in unexpected behavior. The router might place orders that weren't intended. An internal implementation may assist in detecting such activities, for example, by determining a total number of child orders going in to the system and the total orders going out. If there is a discrepancy, the broker internal implementation may be configured to flag that there is a problem. Factors that may be examined may be total quantity of orders, size of orders, and symbols. Orders may be matched by comparing/linking outgoing BKs to incoming CKs.

The internal implementation of the supervisor may be configured to send out can send out alerts when detecting an anomaly. Alerts may also be actionable. For example, the internal supervisor may be able to block further orders coming out of a particular router from being sent externally from the broker, or the internal supervisor may have the ability to send a control message to the order router to stop filling orders or shutting it down entirely.

Sometimes, the precise router with the problem may not be readily identifiable, or there may have been a problem with how the order was segmented across routers. In those cases, the internal supervisor may prevent any orders stemming from the matching CK or DK from being processed. A control message may be sent to all outgoing routers to cease processing orders from that CK or DK, or external-facing proxies may block order fill requests matching that CK or DK.

Actions from alerts may happen in real-time, but there may also be a danger in overreacting to perceived problems that are actually working as intended. Acting on false positives may be as problematic as missing problems.

In some embodiments, an internal supervisor may be configured with a threshold so that only when order filling activities exceeds the client's total order plus the threshold, would action be taken. To help determine an appropriate threshold, the internal supervisor could be initially configured to operate in alert-only mode before enabling actions based on alerts.

There may be other information or parameters to be monitored instead of or in addition to orders in/orders out. The internal supervisor could monitor order fill frequency to identify order router algorithm failure, or sub-optimal performance. Any time any order comes in or goes out, the internal supervisor can correlate and check against any rules programmed into the system.

In some embodiments, the internal management/monitoring of data processes within a system can provide advantages over traditional monitoring techniques. For example, when individual processing components monitoring and reporting their own behaviour, should a component malfunction or die, its reporting may fail or cease causing a lack of information at a critical time. Additionally, any change in router topologies or the addition/subtraction of components may require changes to the monitoring system.

However, in embodiments of the supervisor system described herein, the monitoring/management can be technology agnostic and continually receive child request data irrespective of whether a node goes down or malfunctions. The system can also provide accurate timestamps as orders enter or leave the system, and through the key management can trace child orders back to their generating devices.

Both Client and Broker Knowing Full Keys, Hashing Algorithm

In some embodiments, the supervisor server may be configured to maintain a public database of encoded (child) orders, which may be indexed (e.g., using an Anonymous Index (AI)). The encoded orders may be listed and retrieved by anyone, but require a copy of the key X, or corresponding decoding key, to decrypt. Optionally, a secure login process may be provided to allow only registered users of the supervisor server to query and retrieve any of the orders.

In order to allow the client to verify/trace the broker's activities, the broker may share its complete encoding keys and any related secure information with the client. In some embodiments, particularly where only one key is shared between broker and client, the client, using the information provided by the broker, may then be able to regenerate a sequence of hashed child keys used by the broker in order to determine which child orders were made from the original parent order. The client may regenerate the child keys using the same process used by the broker to generate the child keys, where the client knows the broker's key, or the client's key in the case of where the client's key was originally shared with the broker, and the hashing algorithm used by the broker. The client may also be able to determine which child orders were related to which other child orders using this process.

In some embodiments, the broker may pre-calculate one more broker keys or child keys prior to receiving an order from a client. For example, it may be advantageous for the broker to perform any required calculations to generate child keys for a particular broker or client key in advance, to reduce latency or processing overhead at the time the client order is requested, particularly where many orders are being received at the broker simultaneously or reasonably contemporaneously.

In some embodiments, instead of the broker generating child keys from a broker or client key, the broker may generate one or more random keys in advance or at the time of the order that are independent from one another, and associate each required child order with one of the randomly generated keys. In this implementation, the broker may share each of the keys associated with the child orders for the client's order so that the client may verify order transaction information with the supervisor server using the received child keys. If the child keys were not generated from a parent broker or client key, then there may be no discernable relationship between the child keys such that the client would be unable to derive the full collection child keys for a particular client order. The client may therefore require to receive the complete list of child keys from the broker in this case.

In some embodiments, the broker may generate any necessary child keys for a client order in real-time or upon receiving a request for an order from a client. Optionally, the broker may rely upon specialized or customized hardware or software, optionally leveraging one or more central processing units ("CPU"), accelerated processing units ("APU"), and/or graphical processing units ("GPU"), to accelerate the real-time calculation of keys.

Optionally, relationship information may be provided in the form of the parameters of a hashing function, a hash table, hashing keys, hash chain information, etc.

From there, the client may request the specific child orders by AI code from the supervisor server, optionally over an encoded communications channel.

As it may ultimately be possible to crack the key X, and thus decrypt the order information, only the client or the broker may know the full key Y, thus only allowing the client or the broker to determine which of the publicly retrievable child orders were placed by the client/broker as part of the same parent order. Optionally, the communication of keys between broker and client may be over an encoded channel. In some embodiments, the supervisor server cannot determine the inter-relationships between orders, even when having received unencoded child orders from the broker.

Therefore, when the supervisor stores the order data in its database encoded with the key X received from the broker, no relationship information between child orders may be stored or discernable from the supervisor server.

Encrypting and Hashing with a Larger Key than Shared for Decryption

The broker may encrypt and hash orders with a large key Y, but may transmit only a truncated key X to the supervisor/venue. A portion of the key may be used in encryption, while another portion may be used for hashing.

The key Y may include: encoding key X that used to encrypt the order, an Anonymous Index (AI) code to identify the order, and additional bits for hashing the series of client keys for each parent order.

By not transmitting the full key Y, the supervisor/venue may decrypt and process each child order, but would not be able to determine how the child order keys were hashed, and therefore be unable to determine which orders are related to one another. This may provide additional security over just using a confidential hashing algorithm, as it may be possible to reverse engineer the hashing algorithm. In some embodiments, conventional hashing algorithms (e.g., MD5, SHA-1, SHA-2, SHA-3, or various National Institute of Standards and Technology algorithms) may be used and associated with the additional bits.

Even if the hashing algorithm were reverse engineered, it could be much more difficult to crack the hashing relationship when only the truncated key is shared. For example, the only way to practically determine how the child orders were hashed is with the full key Y, which is only available to the broker and the client.

For example, the key Y may be 384 bits long with the encoding key X being 256 bits, and the AI code being 32 bits. The remaining 96 bits would be kept private (e.g., not transmitted to a venue or supervisor), increasing the difficulty for a venue or supervisor to regenerate the sequence of child keys from the first one.

In some embodiments, the 384 bit root key may be transmitted in its entirety back to the client in the ACK message. This key may facilitate the regeneration of the sequence of hash keys that the broker used to process the order. For example, a client or various computing systems used by the client may be used to regenerate this sequence (e.g., a sequence of repeated hashes, where a previous hash is the input into a later hash function) and therefore determine the relationship between various child orders and/or client orders.

The regeneration of the sequence may, for example, enable a client or a party associated with the client to identify all child orders that spawned from a client order, for example, so that the client can assess the performance of the broker. For example, the performance of the broker can be assessed against best execution practices, which, may evaluate the orders received by a broker and periodically assess whether the broker utilized competing markets, market makers, or electronic communications networks (ECNs) that offered the most favorable terms of execution at the time of execution. Some of the factors a related to best execution may include: the opportunity to get a better price than what is currently quoted, the speed of execution, and the likelihood that the trade will be executed.

A potential challenge may be that third parties are able to monitor various elements of information to statistically correlate clients with trades, for example, through temporal association. Various strategies may be utilized to aid in client obfuscation.

In some embodiments, the exact bit length of key Y may also not be publicly disclosed by the broker, for additional security.

The bit length of key Y may also vary from order to order, for additional security. In some embodiments, filler, padding, or throwaway bits may be used, for example, to cause the bit length of key Y to appear to be uniform. The length of key Y may be configurable and reconfigurable as needed, including increasing the key length as may be required or recommended in accordance with certain encryption standards.

This method may also mask the number of child orders in a parent order, thereby hiding from the respective venues whether they received the entire parent order or not.

In the context of FIG. 2, in this example, the destination keys ($DK_N$) may only be portions of a full key, the destination keys permitting the decryption of the child order, but do not permit the supervisor computing systems 106 to determine the relationship between various child orders received from a broker (e.g., the full key may be required for this). The full key may be provided to the client computing systems 102, which may then use the full key to decrypt and associate child order processing information that may be retrieved from the supervisor computing systems 106. In some embodiments, the child order processing information may be published as a publicly available report, which includes processing information associated with various orders. In some embodiments, the processing information is encoded.

Computing Tool

In some embodiments, a computing tool may be provided, the computing tool configured for the correlation of keys to client orders. The computing tool may be configured for the analysis and reporting relating to the routing of orders to venues.

For example, the computing tool may be configured to conduct analyses, such as verifying that orders were indeed routed in accordance to instructions, orders were routed in accordance to "best execution"; determining differences between "best execution" and the order processing as routed; determining the average time required to fulfill an order; comparing prices and/or quantities of orders processed compared to desired orders, etc.

This information may, for example, be useful in providing insight into the routing and efficiency of their order processing. In some embodiments, the computing tool compares client order message logs with the services encoded message logs for the client and generates a report of discrepancies.

The computing tool may be implemented as software, hardware, a web service, individually or in various combinations.

The computing tool may be configured to, for example, receive and/or automatically access encoded information (transaction information, market data, etc., received from a supervisor's computing systems or from a venue's computing system; based on a copy of the client's orders (including the encoding/decoding keys and/or transaction log information), access the encoded data, decode and compare the information with the client's information; and/or produce one or more reports.

In some embodiments, the computing tool may be configured to generate and/or provide secure encoded keys for the client and/or the client computing systems 102 to use when sending orders to brokers and/or broker computing systems 104. For example, the computing tool may include a random number generator which can generate a series of keys for each client. These may, for example, be based on the data/time and/or a unique key parameter as defined by client personnel. The computing tool can include key management functions: constructing keys, refreshing keys, alerts to create new keys and so on.

Generation and/or providing of encoding/encryption keys may be conducted on an individual key request service and/or as a block service.

Potential benefits of providing a computing tool may be reduced development requirements and/or technical support, ease of adoption of the system, and ease of upgrading and/or modifying the system.

In some embodiments, the computing tool may be configured to provide analytic support, such as the development of benchmarks, reporting, statistical analyses, heuristic analyses, comparisons with market condition data, etc. The analytic support functionality may support various analyses based on historical routing information, industry-standard routing metrics, key performance indicators, etc. For example, the computing tool may be configured to conduct root cause analysis, regression analysis, modelling, prediction and/or forecasting.

In some embodiments, the computing tool may be configured to automatically issue notifications based on, for example, identified trends based on routing practices of brokers. For example, the computing tool may be configured to send out a notification when the computing tool identifies that a broker has routed an order in violation of a client's instructions, or has routed an order in violation of leading practices.

Masking Order Retrieval

The client's activity in retrieving orders should also be masked. To further hide the real orders, the client may also request a random number of additional orders from the supervisor server, or may periodically, continuously, or randomly request orders from the supervisor server to mask when the client is requesting real orders from the supervisor server. For example, the client computer may be configured to request data from the repository every day at a particular time or times regardless of actual client trading activity.

Padding Public Order Repository with Encoded Entries

In some embodiments, a repository holding order information (which may be encoded) may be exposed to the public. Accordingly, various characteristics, such as the number of orders, the date in which they are added, the length of the data corresponding to the orders, etc., may all be used by a third party in determining aspects of the orders.

The system may be configured to pad the public database/repository with encoded entries formatted to be undistinguishable from other real encoded order entries so that it may be more difficult to determine the source or interrelationships between orders based on the order volume or timing. The supervisor server may not be able to distinguish real encoded order entries from the padded encoded entries.

This may be achieved by the supervisor server creating and storing a sufficient number of encoded entries to mask either a total number of real orders in the system, or to mask a number of real orders created within a particular time period.

The number of encoded entries created and the timing for the creation of the encoded entries may vary.

The supervisor server may be configured to generate a fixed or random number of encoded entries when a threshold number of real orders are achieved, at random time intervals, or at random real order threshold numbers.

In some embodiments, the supervisor is configured not to log what orders are real and which are not.

There may also be other ways for the encoded entries to be generated for recording in the database other than generation by the supervisor server itself.

As the broker provides decryption and relationship information, as described herein, to the client, the broker and the client may still be able to determine which records are real and distinguish those records from other encoded records.

Multi-Leg Heuristic Search

In some embodiments, supervisor computing system 106 or client computing component may be configured for various types of data queries. Heuristic approaches may provide various technical benefits, especially where there is a large volume of data to be processed and the available computing and/or time resources may be constrained.

For example, a client computing component may query trade data from supervisor computing system 106 by requesting blocks of AIs. The AIs are calculated along with DKs from a merge of the clients CK assigned to the client order and the sequence of BKs assigned to child orders.

In an example case of a single broker entity acknowledging client orders and generating child orders, client computing component would simply generates $BK_0$ through $BK_N$ and query the corresponding trades using $AI_0$ through $AI_N$ until the entirety of the order is accounted for.

In a Multi-Leg scenario, only a subset of possible BKs may be used, depending on which broker entities are handling the order.

Figure 10:
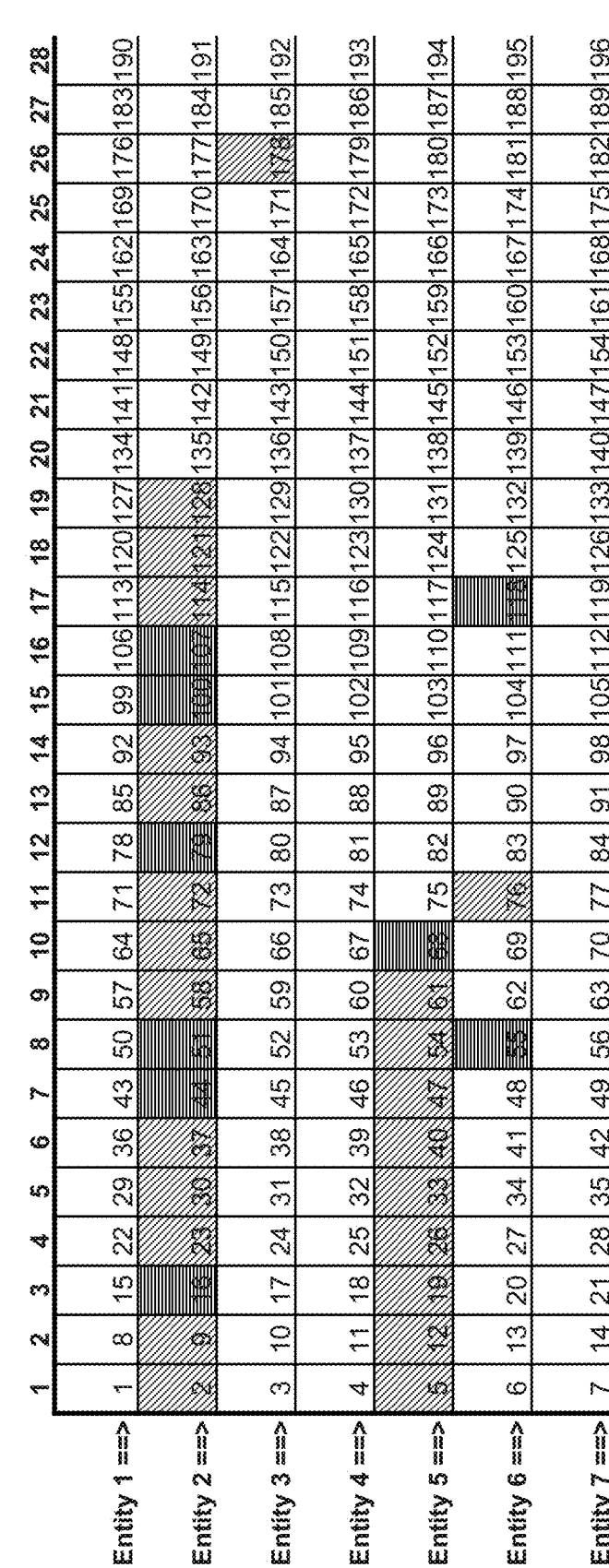
FIG. 10 is a table illustrating a possible scenario where a modulo 7 (e.g., where a divisor of 7 is used in the context of a modulo operation) scheme is in use and 4 of the entities were involved in handling the order.

FIG. 10 is a table 1000 illustrating a possible scenario where a modulo 7 scheme (e.g., where a divisor of 7 is used for modulo operations) is in use and 4 of the entities were involved in handling the order, according to some embodiments. Other modulo schemes and/or values may be possible, and FIG. 10 is provided for example purposes.

The cross hatched boxes represent BK indices used for orders that did not have any associated fills, and the longitudinally hatched boxes represent orders that did result in fill.

The following examples demonstrate a possible heuristic that could be used to search for orders. The heuristic may use several configurable parameters:

SWEEP=the number of columns of BKs that will be exhaustively swept—or searched (in this example set to 2).

BURST=the number of BKs that will be searched in a row to see if there are any additional orders for a given entity once at least one order has been found (in this example set to 5).

MAX_SWEEPS—maximum number of times sweep will be repeated to find missing fill quantity (in this example, set to 3).

Search BKs 1 through 14 (SWEEP×modulo=2×7=14)— Found orders 2, 9 for entity 2 and 5, 12 for entity 5.

Repeat BURST along row for entity 2 until entire burst list of BKs contains no orders. Search 16, 23, 30, 27, 44 (orders found), search 51, 58, 65, 72, 79 (orders found), search 86, 93, 100, 107, 114 (orders found), search 121, 128, 135, 142, 149 (orders found), search 156, 163, 170, 177, 184 (orders not found, stop searching). Found fills but still remaining quantity still >0.

Repeat BURST along row for entity 5: Search 5, 12, 19, 26, 33 (orders found), search 40, 47, 54, 61, 68 (orders found), search 75, 82, 89, 96, 103 (orders not found, stop searching). Found fill, but still remaining quantity.

Repeat sweeps up to MAX_SWEEPS times to try to find missing fill quantity starting with BKs that were not searched yet: Search 15, 17, 18, 20, 21, 22, 24, 25, 27, 28 (nothing found after sweep 1), search 29, 31, 32, 34, 35, 36, 38, 39, 41, 42 (nothing found after sweep 2), 3rd and final sweep search 43, 45, 46, 48, 49, 50, 52, 53, 55, 56 (order found in 55—so do Burst on Entity 6).

Repeat BURST along row for entity 6: Search 62m 69, 76, 83, 90 (found order), search 97, 104, 111, 118, 125 (found order), search 132, 139, 146, 153, 160 (no order found, stop search). Remaining fill quantity=0, Heuristic complete.

In the previous example order with BK index 178 was not found. If the SWEEP parameter was larger, like for example 15, 178 would have been found.

The parameters can be kept small to minimize the amount of data to be queried and the computation time. However, the smaller they are, the larger the chance that order with large gaps of missing order will be found.

Note that even with very small parameters, well behaved entities (ones with no gaps) will be completely found with a minimal amount of computation and queries.

The heuristic may not found all fill quantities if there are large gaps in the order flows, but that will be detected if the remaining fill quantity >0, but MAX_SWEEPS have been exhausted and the fills have not been found.

The heuristic will not at all detect unfilled orders following large gaps if the orders that were found accounted for 100% of the fill quantity.

In some embodiments, the instructor/requesting device can be configured to attempt to decode portions of the data set received from a supervisor server using keys from at least one set of the modulo-indexed keys. Each set containing M consecutive keys. Where M represents the divisor or the maximum number of computing entities in the system. In the example in FIG. 10, M is 7, and each column represents a set.

While the processors can attempt to decode one or more sets (i.e. columns in FIG. 10), in the example above, the processors sweep two sets (SWEEP=2).

Based on whether keys in the sweep corresponding to a single modulo-index successfully decode portions, the processors can first attempt to decode using only the successful keys. For example, in FIG. 10, modulos 2 and 5 were successful in the initial sweep, so the initial burst decoding attempts use the keys in the rows corresponding to entities 2 and 5 in FIG. 10.

Example Techniques, Variations and/or Algorithms

Various encryption algorithms and/or techniques may be utilized in any of the embodiments described herein, for example:

An algorithm for generating random keys of a specified length (e.g., a random number generator that can be run in query/response, or call/return mode to generate individual keys, and/or can be run to generate a block of keys). In some embodiments, the algorithm for generating random keys may be configured to be seeded to avoid duplication among different clients (for example, pseudo unique keys may be generating using time of day and date information, server IP address, MAC address, server name), each client may be associated with a "secret" seed code which is the length of the key, pseudo random, non-predictable and non-reproducible numbers may be used to further randomize the seed, including the size of operating system temporary files, swap space, counts of I/O bytes on network interfaces, and current memory and resource usage on the system, among others.

An encryption/decryption algorithm utilizing ~256 bit or larger keys—as a record size may be relatively small (~1K bytes) or only around twenty times larger than the key, the encryption and decryption may be conducted by hashing the key into a 1 kilobyte or larger random string and then conducting an exclusive OR (XOR) operation on it with a scrambled copy of the record for encryption and the complementary operation for decryption. A potential advantage of such a scheme is the potential reduction of the computational complexity of the encryption/decryption functions. In some embodiments, keys less than 256 bits may also be used.

A hashing algorithm to generate a series of keys from a single parent key. The hashing algorithm may be used to generate series of child orders each with a unique key.

Storing encoded/encrypted/decrypted data as printable/displayable characters, which may reduce complexity associated with downloading binary files. For example, a 6 bit/char encoding scheme may be utilized, which may only results in a 33% increase in file/data size. In some embodiments, encoded/encrypted/decrypted data stored as printable/displayable characters may be used for representing keys in FIX message tag fields.

A function may be utilized to combine multiple keys into a single key (for example, being used to enable a broker to generate a processing key and then to generate a destination key from the combination of the client key and the processing key.

An encoding scheme may be provided that allows the key size to be configured, potentially allowing future key size expansion.

As a further example, the following techniques may be utilized for the generation of child keys, encryption, and decryption of child orders and/or other encoded entries:

A random key generator (e.g., assuming a 256 bit key) may be utilized to generate a block of Keys using a pseudo random number generator from a non-reproducible seed.

A key merge function may be provided to merge 2 keys into a single key: Generate $K_C=f_{Merge}(K_A, K_B)$. The key merge function should be a computationally light function, and should be configured such that it is difficult to extract original keys from merged key.

The system may need to have functionality for hashing a first key into a second key to potentially generate an arbitrary list of keys that can be generated from a starting key, generating $K_{N+1}=f_{Hash}(K_N)$. The hashing should be conducted such that it should be difficult to determine key $K_N$ from key $K_{N+1}$ or to determine that a set of messages are part of a single key chain.

The system may also include functionality for encrypting a record using a key, (e.g., Generate <Encrypted Record>=$f_{Encrypt}(K, <Unencrypted Record>)$. Such a function may also be adapted to pad the record to obfuscate at length related information.

The system may include functionality for extracting an Anonymous Index from a key (e.g., Generate AI=$f_{AI}(K)$), and conduct various AI related record activities, such as finding all records that match an AI, sort a set of record based on an AI, decrypting a record (e.g., Generate <Unencrypted Record>=$f_{Decrypt}(K, <Encrypted Record>)$, padding a record, generating an encrypted entry, and generating AI requests.

Computational Complexity

Various encryption techniques may be utilized. A potential advantage of using random keys may be the relative ease of generating large random numbers from a non-predictable temporal seed.

For example, the generating entity (e.g., the client computing systems or the broker computing systems) may generate large blocks of random numbers in advance (e.g., at start-up or as a batch process) such that there may not be additional computational complexity during order processing.

Broker computing systems may benefit from faster computation as they may be generating keys for child orders upon receiving the keys from parent orders.

The verification of routing information may be performed after trading hours to reduce the impact of the computational activities during peak hours.

In some embodiments, the client may desire to verify order routing in real-time, immediately or shortly after the client's order is processed. While this is also possible, the anonymity of the client may be compromised if the client queries the supervisor server for order verification immediately after placing the orders. Close observers of the supervisor server may be able to reasonably infer that orders placed immediately prior to the order verification queries may be associated with the querying client. Accordingly, where real-time order routing verification is required, the client's computer or server may be configured to constantly query the supervisor server. The client's computer could then discard or ignore any orders not associated with the client, while decrypting the rest. In some embodiments, the supervisor server, or a separate server connected to the supervisor server, may be configured to broadcast out all data from the supervisor server as it is recorded there. Any client computer could subscribe to the broadcasted data and extract only orders associated with the respective client, for example by anonymous indexes known to the client.

Order Masking

The encoding/encryption keys themselves may also inadvertently provide information to a third party (e.g., the third party may be able to glean information from key lengths, patterns, etc.). The same may occur due to lengths and patterns of the encoded/encrypted messages.

Accordingly, in some embodiments, the keys may be 256 bits or longer—either as the client key alone, or as a hybrid key as provided from the broker computing systems.

In some embodiments, a printable character encoding scheme is used with FIX messages, where a 256 bit key could be represented as a 43 character string.

In some embodiments, order messages may utilize padding techniques so that there is a standard length to the message, which may help conceal information that can be gleaned from message lengths.

In some embodiments, the total number of order messages may be masked trough the addition of a random number of encrypted entries.

Scaling Verification

In conducting verification of the encrypted information/ciphertext, there may be large volumes of data involved. Accordingly, the verification may be computationally intensive and various techniques may be applied to reduce the computational requirements.

For example, if a client sent in 1 million orders, the client may need to attempt to decrypt 1 million orders using 1 million keys out of a pool of 200 million orders, and such an activity may be computationally challenging. An example algorithm may require several microseconds of CPU time per key/message attempt, and even on an example 16 core server, there may only be 10 million key/message attempts processed per second. In this example, to find the 1 million orders in a pool of 200 million would require 200 trillion computations or around 20 million seconds of CPU time (about 8 months).

Potential solutions to these issues may arise through the creation of an index.

In some embodiments a portion of the key may be utilized in establishing an index (for example, out of an example 48 character key, a 5 character index would be extracted, resulting in a 30 bit index with about 1 billion possible values).

The index could be exposed and assigned to each of the 200 million message records and pre-sorted based on the indices.

In this example, the actual key may be the full 48 char (288 bits), and the exposed key may be 5 characters that may be exposed. The key is still secure since the remaining 43 char (258 bits) are hidden.

Since the client knows the index for all 1 million orders, a first step may be to find the matching records for each of the 1 million orders based on the index. Most indices would only get a single match, and a small percentage would get 2 or more matches so the total number of decryptions would likely be a reduced number. Accordingly, verification may be feasibly done as computation may be reduced as compared to an implementation without the use of the index as described above.

In some embodiments, the computational tool may be configured to provide a query service where only matching indices are downloaded upon request by the client. The client can query any number of indices for downloading the respective associated order information to mask the specific orders and number of orders that match the client (oversubscription masking).

The service can publish a list of existing (non-empty) indices along with each data set to facilitate this oversubscription masking.

Record Format

Figure 3:
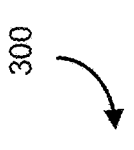
FIG. 3 shows an example record format.
Figure 3:
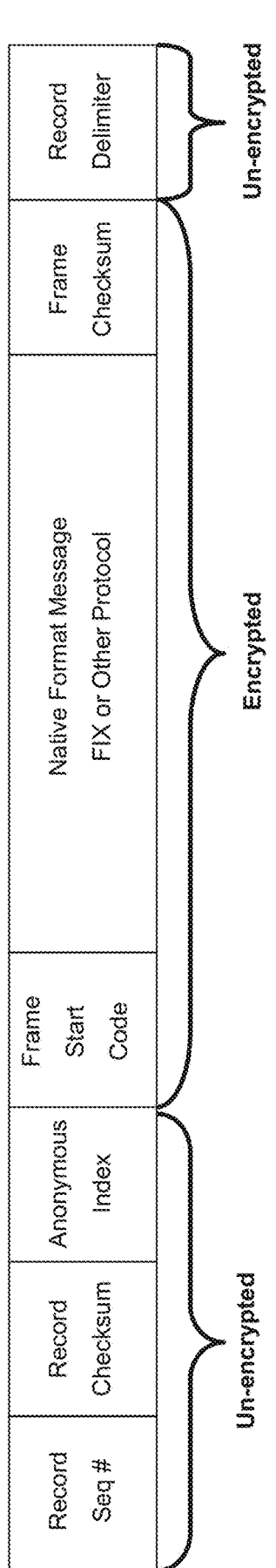

FIG. 3 shows an example record format, according to some embodiments.

In some embodiments, the encrypted message data may be stored in a format that allows delimiting individual records, exposes the index string for each record, and/or allows for a record sequence number and checksum (to ensure that all records have been downloaded and that none of them have been corrupted or truncated).

The supervisor system may also store the records into a data storage, such as a database. Accordingly, the data storage may be configured to returns various values, such as 1 or 0 "records" per AI based query. Each "record" may contain any number of concatenated "messages", and each message may be encrypted with its own DK key. A "query" may be conducted, wherein a request for 1 or more "records" from the data storage is conducted.

Since the query time round trip time may be tens of milliseconds or more even for a single record, proxies, computing tools, and/or other applications that access supervisor computing systems 106 can improve efficiency by requesting large blocks of records (even thousands at a time).

The data that is stored in the supervisor computing system 106 is a series of message records stored based on the AI code. The data may be indexed/queried by the following fields: Date; AI; Region code; and/or Instrument type/Data type.

The record that is returned may have the following "header" information for the entire record: Length of record in bytes; and/or an arithmetic checksum of the record (e.g., 32 bit checksum).

The data may be a concatenated series of records each having an unencrypted portion and an encrypted portion.

The un-encrypted portion, for example, may have a record delimiting scheme, length of record, a number of messages, and a record checksum (used to validate transmission and buffering of record—e.g., 32 bit arithmetic sum of all bytes in record). The encrypted portion, for example, may include a data message having a raw copy of the message in its native protocol (e.g., FIX or other protocols such as OUCH. SAIL); a timestamp of data message (nano-second resolution timestamp); a message protocol type; and a message checksum (e.g., a checksum that is protocol independent, such as a 32 bit arithmetic sum of all bytes in message that can be used to validate decryption).

The actual order/transaction message can be imbedded in a frame which is also encrypted. Part of the frame may be a start code that may be used to indicate if the frame is a likely match for the decryption key.

In other words, the only automated way to verify correct message decryption is to check the message in its native format (FIX for example has a standard checksum field, and starts with a standard string like "8=FIX"). However, it requires an assumption as to the protocol and format of the message.

In some embodiments, complexity may be reduced through using a frame format that encapsulates the target message such that it may be used independently to verify the validity of the message independent of the format.

For example, a frame may start with the string "XX" and end with a 4 character checksum. In this example, all the characters in between would be the original encrypted message. There may be potential benefits as such an implementation may allow the handling of messages that are not formatted as FIX messages, such as binary message formats that may be utilized by some exchanges.

The records may also include, for example:

A CryptoKey—This tag contains the CK, or DK/AI keys. This key is used by the Supervisor service to encrypt and index the message in the Supervisor data store.

A BrokerKey—provided by brokers upstream on order fills/ACKs to indicate the first key of a sequence of keys assigned to child orders. This tag is required if a broker is handling an order that had CryptoKey set from the client and the broker has generated one or more broker keys for the outgoing child orders. This field may, for example, be a string representing a BASE64 encoded 512 bit BR key. It can be used in the ACK message send back from a broker to a client/broker upon receipt of a new order with a CK. This tag can also be used internally within a brokers stack to communicate BK keys among entities within the stack.

BrokerMode—this tag indicates how the broker is handling Supervisor orders. This tag is a char and can have one of the following values: 'A'—the full CK.BK key encryption scheme is in use; 'C'—key is entirely client controlled; 'B'—key is entirely broker controlled; 'P'—the client is not provisioned for supervisor order storage; and 'X'—client has chosen not to store this order in a supervisor computing system.

Conventions

The supervisor methodology may require that cryptographic keys be passed among clients, brokers, and the supervisor. To simplify this methodology as much as possible, and allow implementation through a simple tag passing methodology, the following conventions may be followed:

If an entity receives a key that is shorter than expected, for example if a broker expects a 256 bit CK key, but receives only a 128 bit key, the field may be front padded with 0's to create the expected key length. For example if an 8 digit key is expected, and 12345 is received, it may be padded into 00012345. If a key has two portions, as in the case of a DK and AI, then the encoding/encryption key, DK in this case, is the left side of the key, and the AI is the right side of the key.

The following are some examples where an 8 digit DK is expected, and a 2 digit AI is expected: If a 10 digit key is received, the left 8 digits are the DK and the right 2 digits are the AI. For example if 1234567890 is received then DK is 12345678 and AI is 90.

If a longer key is received with 14 digits then once again DK is the left most 8 digits, and AI is the right most 2 digits. For example if 12345678909876 is received the DK is 12345678 and AI is 76. The 9098 in the middle is discarded.

If a shorted key is received with 8 or 9 digits, then the same rule applied. For example if 87654321 is received then the entire key is use for DK, 87654321, and the right most 2 digits, 21, are the AI.

If an even shorted key is received with for example with only 5 digits, then the key is padded out and then the above rules for DK and AI are applied. So for example if 54321 is received, it gets padded to 00054321 and that becomes the DK, and the AI is the right most 2 digits, 21.

This methodology potentially helps remove issues with front padded 0 numbers being incorrectly handled. Basically, numerically 0123 is the same arithmetic number as 123 but cryptographically they are different, so by left padding with 0's, this problem may be resolved.

The goal is to have the supervisor computing system work if the broker passes the client's CK key through to the supervisor computing system without ever assigning BKs, and then generating DKs and AIs. Using the above convention, the methodology may work even if CK is smaller or larger than the required DK and AI.

This methodology may facilitate backward and forward compatibility if the encryption and hashing functions are changed or enhanced in the future. Rollouts of new technology can be incremental while maintaining backward and forward compatibility. This key passing protocol is used for CKs, BKs, DKs, and AIs, and any new keys in the future.

Broker as Client

In some cases, the broker may be receiving orders from a second client who is itself a broker for a first client. It may be desirable for the second client to be able to verify the actions of the broker. It may also be desirable for the first client to be able to verify the actions of the first client's broker, and also the second client's broker. In some embodiments, the supervisor server of the present invention may be used as a supervisor between the brokers in addition to being used as a supervisor between the ultimate broker placing orders and the venues. Optionally, the first client's broker may share the first client's broker key with the first client, and may also transmit that key to the second client's broker so that the second client's broker may generate child orders using the key shared between both clients. In this way both the first client's broker and the first client would be able to each retrieve and decrypt order information from the supervisor server. Alternatively, the second client and the broker may use a second key not shared with the first client. Optionally, the second key may be based on or derivable from a first key shared between the first client and the first client's broker.

EXAMPLE EMBODIMENTS

The following section describes some embodiments. Other embodiments may be contemplated and these embodiments are provided as examples. Additional, the same, different, less, and/or alternative elements may be included in various other embodiments.

In some embodiments, there may be a potential advantage to implementing the supervisor server as a separate server from the broker or the venue, as the supervisor may then be better equipped to consolidate all orders in one database, thereby possibly achieving more robust masking of client orders than if each broker or venue maintained its own supervisor server operating in hardware or software.

Example 1

In some embodiments, a client may transmit an unencrypted order along with a client key that is provided by the client through a secure channel to a broker.

The secure channel itself may be encrypted, etc., but the order is not encrypted with the client key. The client key may be embedded as a tag or field in the order. The client maintains a log of client keys and orders, for example, in a database 110 maintained by the client. The database 110 may be implemented using various database technologies, such as relational databases (e.g. SQL databases), flat databases, excel spreadsheets, comma separated values, etc. If the database 110 is implemented using relational database technology, the storage database 110 may be configured to further store relationships between various data records. The storage database 110 may be implemented using various hardware of software technologies, such as solid state or hard disk drives, redundant arrays of independent disks, cloud storage, virtual storage devices, etc.

The broker may generate child orders based on the client's order, and sends each order to the supervisor with a hash of the client key so that each order can be linked back to the client's original order. The hash may be client specific, broker specific, specific to client-broker relationship, etc.

The supervisor may maintain a log regarding the orders sent to one or more venues and their associated child key, and send the orders to venues, the orders being stripped of any key information.

The supervisor may then publicly publish all transactions (orders, cancels, replaces, fills, etc.), encrypted with the corresponding child key.

A client may then access/retrieve transaction information, and verify actual transactions with orders sent to the broker using the log maintained by the client. In some embodiments, a computing tool may be utilized for the verification and/or other analysis of the orders.

Example 2

In some embodiments, instead of a client providing a client key, a broker, upon receiving a client order from a client, generates a client key and communicates it back to the client. For example, the broker may communicate the client key using in the course of an acknowledgement message.

Example 3

In some embodiments, there may be no supervisor and the venues may receive the child orders and the keys. The venues may further encrypt transaction information using the keys and clients may retrieve and access this information, decrypt it and use it to verify characteristics associated with the routing of their orders. For example, the client may directly communicate with the respective venue to obtain the order routing information. For example, one or more venues may report order routing information to a supervisor server after having received orders from brokers. The client may then retrieve the order routing information from the one or more venues from the single supervisor server.

Example 4

In some embodiments, asymmetric keys may be utilized. For example, a client may expose a public key which may be utilized to encrypt order information related to the client's orders. The client may maintain a copy of the associated private key for use in decryption.

Example 5

In some embodiments, a broker may append a sequence number to the end of the client key and then hash it to create the child keys. Such an implementation may be helpful for a client to determine how many child orders may be associated with their parent order.

Example 6

In some embodiments, the broker assigns a processing key to each client order, communicates the processing key to the client, and then generates a destination key for each child order to the exchange based on a combination of the client key and the processing key.

Example 7

In some embodiments, an index is associated with the transaction information to aid in the identification of which orders belong to a client. For example, the index may be established through the exposure of a portion of the key, or utilizing different hashes of the key to act as the index.

A client may download and/or only process information having the proper indices, potentially reducing the overall computational time required for verification.

Example 8

In some embodiments, the supervisor or the venue may buffer messages and/or pad messages such that the messages have a uniform size. In some embodiments, the supervisor or the venue may buffer messages and/or pad messages such that the messages have a random size.

Example 9

In some embodiments, clients may be configured to download additional indices or all indices to mask orders.

Example 10

In some embodiments, the supervisor or the venue may add random encrypted entries to the information provided.

Example 11

In some embodiments, the supervisor may be configured to collect request data for routes in which there are no intermediary systems (i.e. 0 hops). In such situations, the supervisor can receive request data being routed directly from an instructor device to a destination device with no intermediary. While not necessarily providing any unknown information regarding the request details, the request data can include timestamps, fill rates and other information for comparison with intermediary performance, and/or to simply provide a more complete picture of an instructor system's activities.

Computing Parameters

The selection of computing parameters may be of relevance to some embodiments in view of the ability and/or need to scale to handle a large number of orders and/or routed orders. The complexity and/or volume of encryption causes constraints on available resources (e.g., processors, memory, time) to become a non-trivial problem to solve. Further, greater computational complexity as it relates to encryption keys may be preferable to enhance the ability to obfuscate and/or maintain confidentiality, but there may be corresponding downstream effects when decryption of the keys is necessary for order verification.

In some embodiments, the broker computing systems 104 or the supervisor computing systems 106 may be conducting the generation of various cryptographic keys. These cryptographic keys may, as described in some of the above embodiments, be configured such that a relationship persists across generations of keys, which, if known in advance, may be used to "re-build" keys if a "seed key" is known.

In some embodiments, various encryption keys may be pre-calculated by the various entities and/or associated computing systems. For example, blocks of CKs can be generated, using independent random/pseudorandom numbers that may be generated automatically at a supervisor computing system 106 or a proxy, for use with clients and/or brokers.

A number of keys may be established and/or pre-calculated, which may correspond to the number of keys required for a day, or in some embodiments, an additional number of keys. Unused keys can be used in subsequent days (random numbers don't expire), and further, BK keys may be generated in blocks of keys. While the initial key in each block may be an independent random number, each block may need to be a practically infinite size block of BKs.

Rather than calculated huge numbers of BKs by running SHA512 repeatedly, a finite number of BKs can be generated that can then be arranged into a multi-dimensional matrix for easier handling. For example a four dimensional 29×29×29×29 hypercube would require the generation of 116 BKs using SHA512, and then could generate 707,281 BKs by X-ORing four BKs for each field in the hypercube. Other types of matrices, having a n-number of dimensions may be used, and a 4 dimensional hypercube is provided merely for illustration. Accordingly, a large number of available BKs may be provided so that in the unlikely event that all of the BKs are used, an algorithm can simply wrap around and continue using the matrix with limited and/or no effect on data security or processing. Using a prime number such as 31 for the dimensions may help improve use of available BKs.

Using the above example, a system could pre-calculate 100K BK blocks (each with 117 entries—BK0+BK1 through BK116.) This would require a little over 1 GB of storage (in RAM) and would provide BKs for 100K parent orders.

The number of bits utilized for encryption may also be an important factor and/or parameter for selection. For example, various types of encryption parameters may be selected, such as the following: CK—128 bits, DK—128 bits, BK—256 bits, AI—32 bits, SHA256 may be utilized to generate blocks of BKs, AES128 may be utilized to encrypt the messages using DKs.

As another example, increased computing power available on higher than 32 bit processors (e.g., 64 bit processors and/or quantum computers), and therefore parameters may be selected that take advantage of this increase of processing capability to improve security (e.g., with increased computing power, malicious parties may also be able to apply the increased computing power to decipher cryptographic keys [e.g., brute force attacks, birthday attacks]).

For example, the computation time for AES256 vs AES128 on a 64 bit processor is only 30% larger and may provide a viable approach. Likewise, calculating SHA512 vs SHA256 on a 64 bit processor may require less than 25% additional computation time.

Accordingly, in some embodiments, an implementation may utilize the following encryption parameters: CK—256 bits, DK—256 bits, BK—512 bits, AI—40 bits, SHA512 to generate blocks of BKs, and AES256 to encrypt the messages using DKs.

A motivation for this change may be to enhance the encryption security by using AES256 may provide a stronger standard for symmetric key encryption. The AI scheme may be enhanced so that an intermediaries may use a subset of significant digits on any given day to database and index messages using AIs. Such an implementation may assist in the scaling of the AI lookup and database scheme without a need to change the protocol or the function of the broker toolkits or the proxy.

With reference to the example implementation in FIG. 9, a client computing device/system may be associated with a client who wishes to provide instructions relating to a specific outcome (e.g., a wish to purchase, sell a particular underlying asset). There may be other instructions associated, such as parameters on how such a transaction should take place, or constraints thereof. For example, the client may wish for the best possible price, the best possible execution, the use of only certain types of routing and/or brokers, the use of only certain venues, execution to take place in a staggered and/or based on a timing sequence (e.g., to ensure synchronized arrival/execution, delayed execution), etc.

The client, through client computing systems 102, may issue such a request to a financial institution, who, for example, may act as a broker or in conjunction with a number of brokers in performing the client's instructions. Notably, the financial institution and/or the brokers may have considerable discretion as to how the transaction should take place, and the financial institution and/or the brokers may, in some circumstances, be required to choose between different options and/or possibilities in performing the transactions and/or steps of the transaction. In some conventional approaches, it has been difficult for a client to determine whether the client's instructions were carried out in a manner that was aligned with the client's interests.

Accordingly, there have been some concerns raised about the propriety of broker and/or subordinate actions. Further, some brokers are under regulatory scrutiny in relation to the execution of client orders being received by the broker and may wish to reduce and/or simplify the regulatory reporting burden by using such a system. The routing verification system may also be used in other contexts, for example, to identify where devices and/or processes are failing transaction standards (e.g., failing to transmit trades on time leading to unfilled orders or disadvantageous pricing), to identify where devices are malfunctioning, to identify differences in performance as between brokers/venues/broker routers, among others.

In this example, the financial institution systems may include a variety of different components, which may include, for example, pre- or post-processing systems, an intelligent routing system (e.g., such as a platform that can be used for latency normalization), network devices/proxies and the like. The client may transmit instructions to the financial institution systems through an instructor computing system linked to an supervisor system, the supervisor computing system being configured to facilitate the verification of routing orders based on information provided by the intermediary computing system.

In some embodiments, the instructor computing system may include a logical application layer, such as an interface that may be configured to interoperate as an extension of intermediary computing system.

In some embodiments, the intermediary computing system is connected to the broker computing systems (in this example, the financial institution data center) and is configured to obtain information related to orders placed by the broker computing systems and submitted to venue computing systems. The intermediary computing system may receive the order information and then pass on the order to the venue, or in some embodiments, the intermediary computing system may simple "tap" into the communications to retrieve the information that is being communicated (e.g., the broker computing systems interact directly with the venue computing systems), and the intermediary computing system may therefore receive trade information having various tags that encapsulate various encryption keys that represent tags used to identify what order belongs to which client/broker instruction, etc. In some embodiments, order acknowledgements may also be captured and information, such as tags, may also be extracted out of the acknowledgement signals.

Cryptographic keys/tags may be generated at various stages of the transaction and by various parties, for example, by the client, by a proxy associated with a client, a broker computing system, a venue computing system, etc. These tags may be used as described throughout this specification, and for example, there may be a client cryptographic key that would be received from a client and then passed through an electronic stack (e.g., brokers, venues, various computing systems).

Depending on the mode of operation, the tag would get passed on all client orders or would get used by child order generating entities to generate DK, AI keys.

A broker key may be a tag that is communicated back to client to indicate the BK key that was assigned to the client order by the broker. This tag may be passed forward through the stack to indicate to all entities that generate child orders which BK0 was selected for this client order.

There may be a "brokermode" tag that may also be passed on, indicative of how an order will be processed by the broker. The "brokermode" tag may, for example, be a character having various values that may be indicative of different modes of operation.

Example modes of operation may include: 'A'—the full CK.BK key encryption scheme is in use; 'C'—key is entirely client controlled; 'B'—key is entirely broker controlled; 'P'—the client is not provisioned for intermediary order storage; and 'X'—client has chosen not to store this order in the intermediary.

For example, if a broker receives an order that does not have a client key tag, then there are three options:

The client may not provisioned to send intermediary-enabled orders on this session so the broker key or broker-mode tags should not be provided in the ACK message or any subsequent return messages.

The client is provisioned to send intermediary-enabled orders on this session with client provided CKs. Therefore the client has chosen not to send this orders through the intermediary by omitting the client key tag. The broker will not send back the broker key tag in the ACK. The broker will send back the brokermode tag with a value (e.g., a value of 'X'), confirming that the order will not be stored in the intermediary computing system.

The client is provisioned to send all orders through intermediary computing system, but the client simply wants the broker to assign the keys. The broker should return the BK0 assigned to the order in the client key tag, and a value (e.g., a 'B') in the brokermode tag indicating that the key assignment is broker controlled.

If the broker receives an order that does have a client key tag, then there are three options:

If the client is not provisioned to send intermediary-enabled orders on this session then the broker key tag should not be returned, and the broker mode tag should be set to a value (e.g., 'P') indicating that client is not provisioned for intermediary-enabled orders.

If the client is provisioned to send intermediary-enabled orders on this session, the Broker may only want to pass the client tag through to the intermediary service. In this case, the broker key tag would not be returned to the client, and the brokermode tag would be set to a value (e.g., 'C') indicating that the key assigned is entirely client controlled.

Alternatively, the Broker may implement the broker key strategy. The broker key tag would be set to the BK0 key that the broker assigned to this client order. The brokermode tag would be set to a value (e.g., 'A') indicating that the full CK, BK cryptographic scheme is in use.

Data may be stored in the intermediary computing systems in various forms, such as in a database storage and/or data storage, having various records. For example, records may be configured for the conducting of various queries associated with various requests.

In some embodiments, the intermediary computing system may also receive information provided from the venue computing systems, such as market data, trade confirmation information, etc. This information may be utilized by the intermediary computing system to determine if the trade was duly executed by the venue, or if other factors interfered with the trade (causing the trade to the missed, the desired price missed, etc.). For example, a broker may surreptitiously route a trade to a particularly slow venue that provides a significant financial incentive for the broker. The trade may be executed in a substandard fashion and such information may be relayed in the corresponding data output by the venue computing systems.

Example Workflows

The following section describes some example workflows 1300, 1400, and 1500 that may be performed by various systems, devices, modules, and/or components, according to some embodiments. More, less, different, and/or alternate steps may be possible, in different orders, permutations, and/or combinations.

FIG. 12 is an example workflow providing steps of an example method from a broker perspective, according to some embodiments. The workflow 1200 may be performed, for example, on a system for managing data processes in a network of computing resources (e.g., a broker computing device), the system comprising at least one processor configured to execute machine-interpretable instructions.

At 1202, a broker computing device may receive, from an instructor device, a parent request for execution a parent data process executable by computing resources. In some embodiments, the instructor device may also be providing at least one instructor key. In some embodiments, the broker computing device may be configured to generate the at least one instructor key and to generate signals for communicating the at least one instructor key to the instructor device.

At 1204, the broker computing device may generate child requests for routing to at least one corresponding destination device each child data, each of child requests for executing at least a portion of the parent request and including a destination key derived from at least one instructor key. In some embodiments, generating the at least one child requests comprises generating a plurality of child requests.

At 1206, the broker computing device may select a sequence of destination keys, each destination key in the sequence for including in a corresponding child request of the plurality of child requests. Selecting a sequence of destination keys, for example, may involve hashing at least one instructor key to generate a first destination key in the sequence and generating a subsequent destination key in the sequence by hashing a previous destination key in the sequence.

In some embodiments, at least one of (i) a hashing algorithm for selecting the sequence of keys, (ii) and a predetermined sequence of keys from which the sequence of destination keys are selected are shared between the system and the instructor device.

In some embodiments, the broker computing device may be configured for hashing at least one instructor key with an intermediary key to generate the at least one destination key and transmitting to the instructor device a message including the intermediary key.

The broker computing device may also be configured to hash a sequence of intermediary keys with the at least one instructor key or derivatives of the at least one instructor key to generate the at least one destination key.

At 1208, the broker computing device may route each of the child requests to the at least one corresponding destination device.

FIG. 13 is an example workflow providing steps of an example method from a supervisor perspective, according to some embodiments. The workflow 1300 may be performed, for example, on a system for managing data processes in a network of computing resources (e.g., a supervisor computing device), the system comprising at least one processor configured to execute machine-interpretable instructions.

At 1302, a supervisor computing device may receive at least one child request being routed from an intermediary device to at least one corresponding destination device, the at least one child request requesting execution of at least one corresponding child data process, each of the at least one child data process for executing at least a portion of the at least one parent data process from an instructor device, and each of the at least one child request including a destination key derived at least in part from the at least one instructor key.

In some embodiments, the supervisor computing device receives from a requesting device at least one of: an instructor key, intermediary key and an index key and generates signals for communicating child requests associated with the at least one of: (i) the instructor key, (ii) the intermediary key, and (iii) the index key to the requesting device.

The at least one child request may be received, for example, from one or more tap devices on one or more routes between the intermediary device and the at least one corresponding destination device.

At 1304, the supervisor computing device may store the at least one child request in at least one storage device 110. In some embodiments, the supervisor computing device may be configured to store the at least one child request in association with an identifier identifying a mechanism by which the at least one child request was obtained by the system.

At 1306, the supervisor computing device may generate signals for communicating the child requests to one or more requesting devices. In some embodiments, the supervisor computing device may be configured for encrypting each of the at least one child request with its corresponding destination key before generating the signals for communicating the child requests.

In some embodiments, at 1308, the destination key and/or the index key may be removed from the at least one child request before transmitting the at least one child request to the at least one corresponding destination device at 1310.

In some embodiments, the at least one destination device may be a further intermediary device, and the supervisor computing device may be configured for receiving at least one intermediary key from the further intermediary device, and storing the at least one intermediary key in associated with the at least one associated child request.

In some embodiments, a particular requesting device having at least one particular instructor key may decode the corresponding encrypted child request to identify the at least one child data process routed for executing at least one particular parent data process associated with the particular destination key.

FIG. 14 is an example workflow providing steps of an example method from a client perspective, according to some embodiments. The workflow 1400 may be performed, for example, on a system for managing data processes in a network of computing resources (e.g., a client computing device), the system comprising at least one processor configured to execute machine-interpretable instructions.

At 1402, the client computing device may transmit, from an instructor device to an intermediary device, at least one instructor key and a parent request for execution of at least one parent data process executable by a plurality of computing resources, the parent request for routing as at least one child request by the intermediary device for execution by at least one destination. In some embodiments, rather than transmitting the at least one instructor key, the client computing device receives at least one intermediary key from the intermediary device.

At 1404, the client computing device may receive, from a supervisor server, a data set including data associated with a plurality of requests.

At 1406, the client computing device may identify portions of the data set associated with the at least one child request using the at least one instruction key or derivatives of the at least one instruction key. In some embodiments, identifying the portions of the data set associated with the at least one child request is based at least in part on the at least one intermediary key.

At 1408, the client computing device may attempt to decode portions of the data set using the at least one instruction key or derivatives of the at least one instruction key and identify successfully decoded portions of the data set.

At 1410, the client computing device may associate an identified portion of the data set with the at least one parent request.

In some embodiments, the client computing device may be configured to generate at least one of: at least one index key and at least one destination key based on the at least one instructor key and the at least one intermediary key; and identifying the portions of the data set associated with the at least one child request is based at least in part on the at least one of the at least one index key and the at least one destination key.

In some embodiments, the client computing device may be configured to generate at least one of (i) at least one index key and (ii) at least one destination key based on the at least one of (i) the at least one instructor key and (ii) the at least one intermediary key; and to send to the supervisor server a request for a data set corresponding to the at least one of: the at least one instructor key and the at least one intermediary key.

In some embodiments, when the identified portions of the data set include data associated with a child request for a second intermediary device, the client computing device may is configured to identify or request additional portions of the data set which are associated with grandchild requests sent by the second intermediary device.

In some embodiments, the client computing device may be configured to generate or select derivatives of at least one of: the at least one instructor key, at least one intermediary key, and at least one index key for identifying the portions of the data set associated with the at least one child request.

General

Although various embodiments described herein pertain specifically to verification of order routing between clients and brokers, the present invention may be applied to various parties to provide for transaction verification across other types of parties in a relationship chain. For example, verification of a variety of ordering or sourcing of materials, goods, or services on behalf of a client may be possible in accordance with the present invention.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code may be applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the following foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may provide for more efficient computation, reduced likelihood of compromise, etc.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Supervisor computing systems 106 may be implemented using various computing devices. The supervisor computing systems 106 may include at least one processor, a data storage device 110 (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the supervisor computing systems may be a server, network appliance, personal computer, laptop, personal data assistant, cellular telephone, smartphone device, video display terminal, gaming console, electronic reading device, and wireless hypermedia device or any other computing device capable of being configured to carry out the methods described herein.

Figure 11:
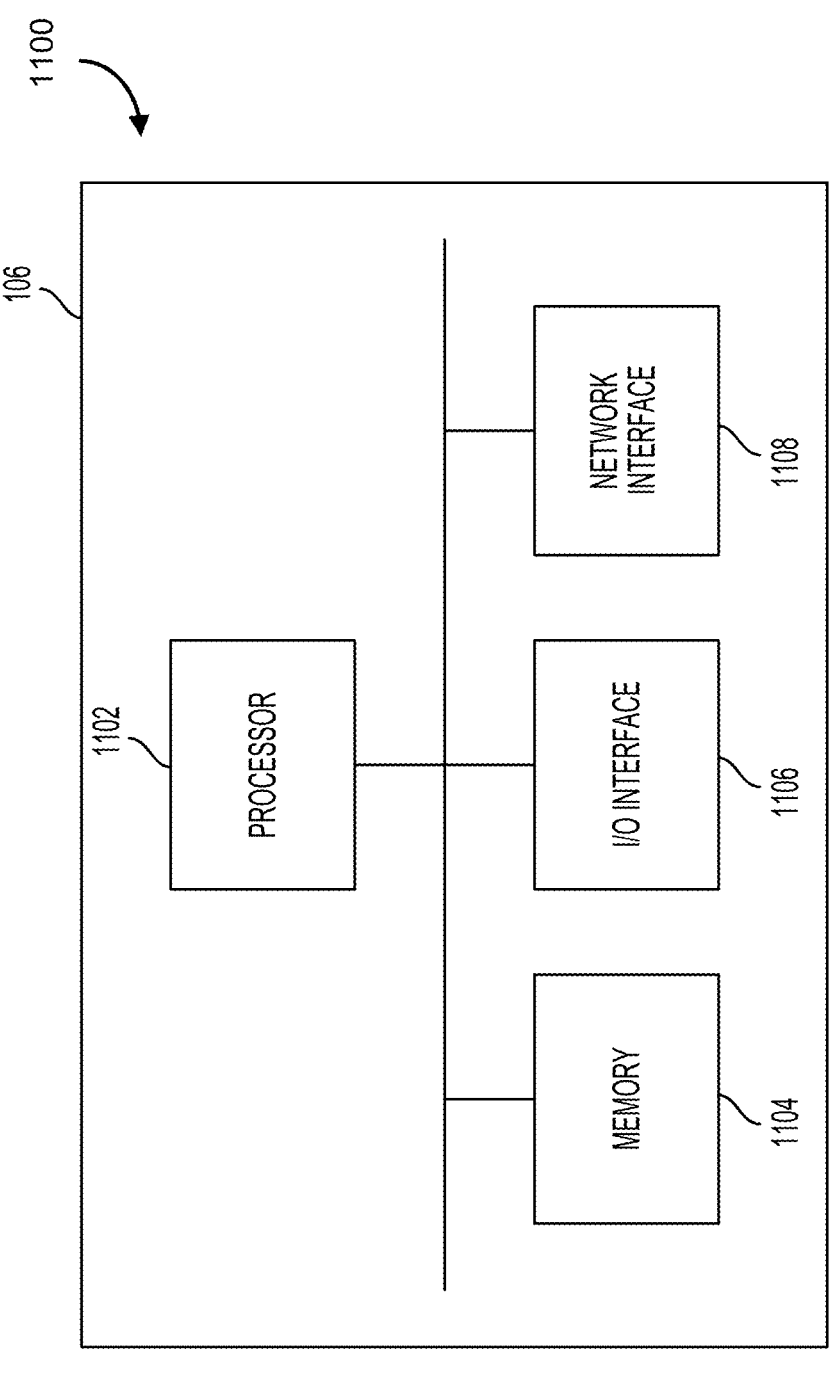
FIG. 11 is a block schematic showing aspects of an example system or device.

FIG. 11 is a schematic diagram 1100 of example supervisor, instructor, intermediary, and/or destination computing systems/devices 106, exemplary of an embodiment. As depicted, supervisor computing systems 106 includes at least one processor 1102, memory 1104, at least one I/O interface 1106, and at least one network interface 1108.

Each processor 1102 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1104 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1106 enables computing device supervisor computing systems 106 to interconnect with one or more input devices, such as a keyboard, mouse, camera, touch screen and a microphone, or with one or more output devices such as a display screen and a speaker.

Each network interface 1108 enables computing device supervisor computing systems 106 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS12 signaling network, fixed line, local area network, wide area network, and others, including any combination of these.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only.

What is claimed is:

1. A system for managing data processes in a network of computing resources, the system comprising:

at least one processing component configured to:

generate at least one first child request for execution of at least one corresponding child data process for routing to at least one corresponding destination device, each of the at least one child data process for executing at least a portion of at least one first parent data process, and each of the at least one first child request including a respective destination key derived from at least one first instructor key associated with the at least one first parent data process; wherein the at least one first parent data process is a subset of a plurality of parent data processes executed by the at least one processing component, each of the plurality of parent data processes associated with a respective instructor key; and at least one supervisor device configured to:

receive parent request data associated with the at least first one parent data process, the parent request data including the at least one first instructor key;

receive child request data associated with a plurality of child requests including each of the at least one first child requests to be routed from the at least one processing component to the at least one corresponding destination device;

identify, from the child request data, first child request data corresponding to the at least one first parent data process, the identifying including: identifying child requests whose associated child request data matches the at least one first instructor key or derivatives of the at least one first instructor key; and generate an alert signal when an error condition is detected with one or more execution characteristics of at least one of the at least one first child requests based on the identified child request data and the parent request data of the corresponding at least one first parent data process.

2. The system of claim 1, wherein the at least one supervisor device is configured to detect the error condition when a discrepancy between the in the one or more execution characteristics of the first child requests and the parent request data of the corresponding at least one first parent data process is detected.

3. The system of claim 1, wherein the at least one supervisor device is configured to detect the error condition when a discrepancy is detected between a total number of first child requests and an expected number of first child requests based on the first parent request data.

4. The system of claim 1, wherein the at least one supervisor device is configured to detect an error condition when a discrepancy is detected in at least one of:

at least one electronic trading quantity value associated with one of the at least one first child requests; or at least one interest identifier associated with one of the at least one first child requests.

5. The system of claim 1, wherein generating the alert signal comprises generating at least one control message instructing at least one of the at least one processing component associated with the error condition to stop processing data processes.

6. The system of claim 1, wherein generating the alert signal comprises generating at least one control message including instructions to stop processing or routing first child requests associated with the at least one first parent data process or with the at least one first instructor key.

7. The system of claim 1, wherein the at least one supervisor device is configured to: detect the error condition when at least one parameter in the first child request data is inconsistent with at least one defined parameter.

8. The system of claim 1, wherein the at least one supervisor device is configured to: detect the error condition when a difference between the identified child request data and the parent request data of the corresponding at least one first parent data process exceeds a threshold value.

9. The system of claim 1, wherein the at least one supervisor device is configured to: detect the error condition when a fill rate associated with at least one first child request is below a threshold value.

10. A method for managing data processes in a network of computing resources, the method comprising:

receiving parent request data associated with at least one first parent data process, the parent request data including the at least one first instructor key; wherein the at least one first parent data process is a subset of a plurality of parent data processes processed by at least one processing component, each of the plurality of parent data processes associated with a respective instructor key;

receiving child request data associated with each of at least one child request to be routed from the at least one processing component to at least one corresponding destination device, each of the at least one child request for executing at least a portion of the at least one parent data process, and each of the at least one child request including a respective destination key derived from the at least one instructor key;

identifying child request data corresponding to the at least one first parent data process, the identifying including; identifying child requests whose associated child request data matches the at least one first instructor key or derivatives of the at least one first instructor key; and generating an alert signal when an error condition is detected with one or more execution characteristics of the identified child requests based on the identified child request data and the parent request data of the corresponding at least one first parent data process.

11. The method of claim 10, comprising: detecting the error condition when a discrepancy between in the one or more execution characteristics of the identified child requests and the parent request data of the corresponding at least one first parent data process is detected.

12. The method of claim 10, comprising: detecting the error condition when a discrepancy is detected between a total number of identified child requests and an expected number of identified child requests based on the first parent request data.

13. The method of claim 10, comprising: detecting the error condition when a discrepancy is detected in at least one of:

at least one electronic trading quantity value associated with one of the identified child requests; or at least one interest identifier associated with one of the identified child requests.

14. The method of claim 10, wherein generating the alert signal comprises generating at least one control message instructing at least one of the at least one processing component associated with the error condition to stop processing data processes.

15. The method of claim 10, wherein generating the alert signal comprises generating at least one control message including instructions to stop processing or routing child requests associated with the at least one first parent data process or with the at least one first instructor key.

16. The method of claim 10, wherein the at least one supervisor device is configured to: detect the error condition when at least one parameter in the identified child request data is inconsistent with at least one defined parameter.

17. The method of claim 10, comprising: detecting the error condition when a difference between the identified child request data and the parent request data of the corresponding at least one first parent data process exceeds a threshold value.

18. The method of claim 10, comprising: detecting the error condition when a fill rate associated with at least one identified child request is below a threshold value.

19. A non-transitory computer readable medium for managing data processes in a network of computing resources, the non-transitory computer readable medium comprising machine-interpretable instructions which when executed, configure at least one processor to:

receive parent request data associated with at least one first parent data process, the parent request data including the at least one first instructor key; wherein the at least one first parent data process is a subset of a plurality of parent data processes processed by at least one processing component, each of the plurality of parent data processes associated with a respective instructor key;

receive child request data associated with each of at least one child request to be routed from the at least one processing component to at least one corresponding destination device, each of the at least one child request for executing at least a portion of the at least one parent data process, and each of the at least one child request including a respective destination key derived from the at least one instructor key;

identify child request data corresponding to the at least one first parent data process, the identifying including: identifying child requests whose associated child request data matches the at least one first instructor key or derivatives of the at least one first instructor key; and generate an alert signal when an error condition is detected with one or more execution characteristics of the identified child requests based on the identified child request data and the parent request data of the corresponding at least one first parent data process.

20. A supervisor system comprising at least one processor configured for:

receiving parent request data associated with at least one first parent data process, the parent request data including the at least one first instructor key; wherein the at least one first parent data process is a subset of a plurality of parent data processes processed by at least one processing component, each of the plurality of parent data processes associated with a respective instructor key;

receiving child request data associated with each of at least one child request to be routed from the at least one processing component to at least one corresponding destination device, each of the at least one child request for executing at least a portion of the at least one parent data process, and each of the at least one child request including a respective destination key derived from the at least one instructor key;

identifying child request data corresponding to the at least one first parent data process, the identifying including: identifying child requests whose associated child request data matches the at least one first instructor key or derivatives of the at least one first instructor key; and generating an alert signal when an error condition is detected with one or more execution characteristics of the identified child requests based on the identified child request data and the parent request data of the corresponding at least one parent data process.

* * * * *